US006692798B1

(12) United States Patent
Sunderrajan et al.

(10) Patent No.: US 6,692,798 B1
(45) Date of Patent: Feb. 17, 2004

(54) KENAF IMAGING BASE AND METHOD OF FORMATION

(75) Inventors: Suresh Sunderrajan, Rochester, NY (US); Sandra J. Dagan, Churchville, NY (US); Robert P. Bourdelais, Pittsford, NY (US); Peter T. Aylward, Hilton, NY (US); Patrick J. Whittaker, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 231 days.

(21) Appl. No.: 09/624,629

(22) Filed: Jul. 24, 2000

(51) Int. Cl.[7] ................................................ B32B 3/00

(52) U.S. Cl. ................................ 428/32.18; 428/32.11; 428/32.2

(58) Field of Search ................................ 428/195, 211, 428/220, 296.7, 32.11, 32.18, 32.2

(56) References Cited

U.S. PATENT DOCUMENTS

| | | | | | |
|---|---|---|---|---|---|
| 5,288,690 | A | | 2/1994 | Warner et al. | |
| 5,389,422 | A | | 2/1995 | Okazaki et al. | |
| 5,418,057 | A | * | 5/1995 | Tokiyahi et al. | 428/323 |
| 5,466,519 | A | | 11/1995 | Shirakura et al. | |
| 5,514,460 | A | | 5/1996 | Surman et al. | |
| 5,637,196 | A | * | 6/1997 | Ogawa et al. | 162/135 |
| 5,670,226 | A | * | 9/1997 | Yoshizawa et al. | 428/40.1 |
| 5,736,242 | A | | 4/1998 | Kato | |
| 5,866,282 | A | | 2/1999 | Bourdelais et al. | |
| 5,888,683 | A | | 3/1999 | Gula et al. | |
| 5,908,728 | A | | 6/1999 | Sakaki et al. | |
| 6,004,732 | A | | 12/1999 | Aylward et al. | |
| 6,030,742 | A | | 2/2000 | Bourdelais et al. | |
| 6,045,965 | A | * | 4/2000 | Cournoyer et al. | 430/263 |
| 6,107,014 | A | | 8/2000 | Dagan et al. | |
| 6,190,781 | B1 | * | 2/2001 | Tsubaki et al. | 428/513 |

FOREIGN PATENT DOCUMENTS

EP 0 947 348 A2 6/1999

OTHER PUBLICATIONS

Weyerhaeuser Product Bulletins "How Paper is Made," "Choosing and Specifying Paper," "Paper Properties" and "Common Problems," retrieved from the Weyerhaeuser website (http://www.weyerhaeuser.com), site visited Apr. 30, 2002.*

Vision® Paper "About the Kenaf Plant" Bulletin, retrieved from Vision® Paper website (http://www.visionpaper.com/), site visited Apr. 25, 2002.*

* cited by examiner

*Primary Examiner*—Cynthia H. Kelly
*Assistant Examiner*—B. Shewareged
(74) *Attorney, Agent, or Firm*—Paul A. Leipold

(57) ABSTRACT

This invention relates to an imaging member comprising an image layer and a paper base comprising a mixture of vegetable fibers and wood fibers wherein said vegetable fibers comprise between 5 and 25 percent by weight of said paper base.

20 Claims, No Drawings

KENAF IMAGING BASE AND METHOD OF FORMATION

FIELD OF THE INVENTION

This invention relates to imaging supports and media. In a preferred form, it relates to base materials for photographic papers.

BACKGROUND OF THE INVENTION

An imaging base such as a photographic paper typically comprises a raw paper base that is coated on both sides with a polyolefin resin waterproofing layer. An alternative waterproofing approach for imaging supports has been proposed in U.S. Pat. No. 5,866,282 (Bourdelais et al.), which utilizes a composite material made of cellulosic base paper laminated with biaxially oriented polyolefin sheets. For imaging applications using base paper that is thus resin coated or laminated, it is desired that the paper base 1) be strong or have a high tensile modulus, 2) be stiff or resist bending forces, 3) be bright and white, 4) be opaque, and 5) have a smooth surface.

A base paper with high tensile modulus and stiffness resists undesirable deformation and curl that results when certain handling and environmental conditions exist. For example, many photographic papers exhibit increased curl on being exposed to low humidity conditions. Stiffer papers that lie flat within the same plane regardless of existing handling and environmental conditions are perceived by the end-user to have greater quality due to a more substantial 'feel' and, therefore, higher value.

Pulps with brightness of 90% or greater are commonly used in imaging supports because consumers typically prefer a white paper appearance. Poor whiteness can degrade photographic Dmin values making certain images such as snow scenes and wedding dresses look gray. Both brightness and opacity are frequently enhanced through the use of inorganic filler materials such as titanium dioxide, calcium carbonate, etc.

As indicated in European Patent 952 483 A1 (DeVries et. al), a smooth surface is not only a customer requirement, but also has critical manufacturing implications, as it defines the amount and technique of application of polyolefin resin. Rougher papers tend to limit the speed of coating and/or cause pits to form in the resin layer. A smoother base paper improves the gloss of photographic paper, while also permitting the reduction of polyolefin used.

In order to achieve the properties listed above, imaging paper bases typically utilize bleached hardwood chemical kraft pulp as it provides high brightness, an acceptable surface, and good formation while maintaining strength and stiffness. To obtain an even smoother surface, it is common to machine calender the paper. Machine calendering, however, typically results in a decrease in stiffness. Machine calendering also typically results in a decrease in opacity necessitating the use of increased amounts of inorganic fillers, such as titanium dioxide. The increased use of inorganic fillers, however, results in a decrease in the strength (or internal bond) of the paper since such materials interfere with the inter-fiber hydrogen bonding in the cellulose fiber network. For papers of the same thickness, tensile modulus determines paper stiffness with the paper having a higher tensile modulus exhibiting the higher stiffness. Papers with higher tensile modulus are frequently derived from pulps with higher tensile modulus, so pulps with higher tensile modulus are preferred. It is also desirable to use a pulp source that imparts greater opacity since this will reduce the need for inorganic fillers and, in turn, increase the strength of the paper through improved cellulose fiber hydrogen bonding.

Generally bleached chemical pulps are expensive due to the extended harvest cycles, low yield per acre, and high handling equipment costs. In addition, as pulp mills open and close capacity, there are frequent and substantial market swings in pulp price causing unpredictability in material costs. It is, therefore, desirable to use a more renewable, more predictable, and potentially less expensive cellulose fiber source.

In U.S. Pat. No. 6,030,742 (Bourdelais et al) a premium photographic element suitable for consumer silver halide images is disclosed. The paper base utilized in U.S. Pat. No. 6,030,742 comprises wood pulp that has been refined and sized with internal chemistry to minimize edge penetration of photographic chemistry into the cut edges of the paper. Further, the paper has a mechanical modulus greater than 800,000 MPa and has a surface roughness less than 0.20 micrometers.

In U.S. Pat. No. 5,908,728 a recording paper formed mainly from a fibrous material with a cationic substance applied onto the surface thereof or impregnated therein contains non-wood fiber is disclosed. Further, disclosed in U.S. Pat. No. 5,908,728 is an image forming method comprising forming an image on the recording non-wood paper by the steps of developing an electrostatic image on a photosensitive member by a developing means with a toner, transferring the developed toner image from the photosensitive member onto the recording paper, and fixing the transferred toner image on the recording paper. The inventon in U.S. Pat. No. 5,908,728 is directed toward the use of non-wood papers for ink jet and toner printing of images taking advantage of the excellent ink absorbency and large ink absorbing capacity of non-wood paper, particularly Kenaf fiber. While the invention in U.S. Pat. No. 5,908,728 is suitable for an ink jet printing base, it fails to meet the quality and performance expectations of a silver halide base material because of problems such as edge penetration of processing solution, surface roughness, and mechanical stiffness of the base.

PROBLEM TO BE SOLVED BY THE INVENTION

The use of hardwood pulps as the source of cellulose fiber in the manufacture of imaging base forces a compromise between paper smoothness, strength, stiffness, and opacity. Pulps that will yield papers of higher stiffness, higher opacity, and higher strength at comparable smoothness and colorimetry are desirable. Hardwood pulp is also a less-renewable, expensive source of cellulose fiber making alternate more-renewable, less-expensive sources desirable.

SUMMARY OF THE INVENTION

It is an object of the invention to provide an imaging support that has superior stiffness.

It is another object to provide an imaging support that has superior strength.

It is a further object to provide an imaging support that has superior opacity.

It is another object of the invention to accomplish superior strength, opacity, and whiteness.

These and other objects of the invention are accomplished by an imaging member comprising an image layer and a paper base comprising a mixture of vegetable fibers and wood fibers wherein said vegetable fibers comprise between 5 and 25 percent by weight of said paper base.

ADVANTAGEOUS EFFECT OF THE INVENTION

The invention provides an improved paper for imaging elements. It particularly provides an improved paper for imaging elements that are stiffer, have higher internal bond, are more opaque at comparable smoothness, and are made from more-renewable cellulose fiber sources.

DETAILED DESCRIPTION OF THE INVENTION

The invention has numerous advantages over prior practices in the art. The invention provides an imaging element that, for the same caliper, is stiffer. This increases the commercial value of the imaging element or instead allows for increased calendering of the paper base improving paper smoothness without excessive loss in paper stiffness. By improving the smoothness of the paper, the contrast range of the image is improved as the blacks appear blacker and the whites appear whiter. The invention provides an imaging element that is stronger as measured by Huygen internal bond. This also provides increased commercial value of the imaging element since it reduces undesirable curl. The invention also provides an imaging element that is more opaque. By improving the opacity of the paper, the amount of undesirable show through when images are viewed by consumers is reduced. While the preferred embodiment of this invention relates to silver halide images, this invention is useful as a base material for other imaging technologies such as ink jet printing, thermal dye transfer printing, and electrophotography. These and other advantages will be apparent from the detailed description below.

These advantages are made possible by the inherent characteristics of a vegetable fiber. In a special embodiment, the vegetable fiber chosen is kenaf. The kenaf plant (*Hibiscus Cannabinus*) is a fast-growing member of the Hibiscus family, a close relative of the cotton plant that, starting from seed, can mature at heights up to 14 feet in less than seven months. Because of its relatively fast growth rates, kenaf may offer a lower-cost, environmentally-friendly alternative to wood pulp. Kenaf stalks provide 2–3 times more fiber per acre than Southern Pine, the paper industry staple in southern USA. It grows in slender straight stems to a height of about 3.5 to 4 m and a diameter of 4 cm at the base. Kenaf fiber originates from the stalk; relatively long fiber aggregates originate from the bark known as bast, while shorter fibers originate from the central part of the stem known as core. The shorter core fibers are similar to hardwood fibers, while the longer bast fibers are similar to softwood fibers. Shorter fibers improve properties such as strength and surface, while the longer fibers improve properties such as stiffness. However, the unique combination of both fiber species in kenaf pulp makes paper-making for imaging applications an opportunity for improved paper.

Kenaf fiber originates from the kenaf stalk; relatively long fiber aggregates originate from the bark known as bast, while shorter fibers originate from the central part of the stem known as core. As shown in the table below, kenaf bast fiber is similar to typical softwood fiber, while kenaf core fiber is similar to typical hardwood fiber. These similarities can be exploited through separating and refining bast and core fibers individually to optimally develop desirable properties as is done in the art for furnishes comprising hardwood and softwood fibers, for example, to optimize paper properties such as tensile, tear, porosity, and opacity. Table 1 below shows a comparison between kenaf bast and core pup compared to standard wood pulp for fiber length and width which are critical to the formation of imaging paper bases. In both the fiber length and fiber width property, the bast and core of the kenaf pulp are significantly different.

TABLE 1

| Fiber Type | Fiber Length, L (mm) | Fiber Width, W (mm) | L/W |
|---|---|---|---|
| Kenaf bast | 2.6 | 0.02 | 130 |
| Kenaf core | 0.6 | 0.037 | 16 |
| Hardwood (Gum) | 0.85–1.8 | 0.015–0.055 | ~50 |
| Softwood (Pine) | 2.9–6.3 | 0.022–0.058 | ~110 |

A paper base comprising a mixture of vegetable fibers and wood fibers wherein vegetable fibers comprise between 5 and 25 percent by weight of said paper base is preferred. This paper is preferred because it is smooth, strong, stiff, bright, white, and opaque providing a high quality cellulose paper for use as a reflective imaging output media where smoothness, tear resistance, stiffness, whiteness, and opacity are perceptually preferred by consumers. Addition of less than 5% kenaf fiber does not adequately improve the quality of the paper, while the addition of over 25% kenaf fiber results in significant deterioration of paper properties such as brightness and colorimetry which are important quality and functional characteristics of an imaging base. The most preferred amount of kenaf fiber added to the cellulose paper is between 10 and 15% weight percent. At between 10 and 15% kenaf content, paper strength, stiffness, smoothness, whiteness, brightness, and opacity have been found to be optimum.

For proper strength and surface development, it is necessary to adequately refine the kenaf pulp. This is best done by separately refining the core and bast fibers. Separation of the two fiber types, however, involves additional processing steps and associated costs. In addition, kenaf pulp is highly yellow and has low brightness. This makes it less desirable for imaging applications at high usage rates since consumers typically prefer brighter and whiter papers.

The preferred basis weight of the paper of the invention is between 110.0 and 195.0 g/m$^2$. A basis weight less than 110.0 g/m$^2$ yields an imaging support that does not have the required stiffness for transport through photofinishing equipment and digital printing hardware. Additionally, a basis weight less than 110.0 g/m$^2$ yields an imaging support that does not have the required stiffness for consumer acceptance. At basis weights greater than 195.0 g/m$^2$, the imaging support stiffness, while acceptable to consumers, exceeds the stiffness requirement for efficient photofinishing. Problems such as the inability to be chopped and incomplete punches are common with a paper that exceeds 195.0 g/m$^2$ in basis weight.

The preferred fiber length of the paper of this invention is between 0.40 and 0.90 mm. Fiber lengths are measured using a FS-200 Fiber Length Analyzer (Kajaani Automation, Inc.). Fiber lengths less than 0.35 mm are difficult to achieve in manufacturing and, as a result, expensive. Because shorter fiber lengths generally result in an increase in paper modulus, paper fiber lengths less than 0.35 mm will result in a photographic paper that is very difficult to punch in photofinishing equipment. Paper fiber lengths greater than 0.90 mm result in a significant decrease in surface smoothness which results in a rough image surface.

A cellulose paper substantially free of dry strength resin and wet strength resin is preferred because the elimination of dry and wet strength resins reduces the cost of the cellulose paper and improves manufacturing efficiency. Dry strength and wet strength resins are commonly added to cellulose photographic paper to provide strength in the dry state and strength in the wet state as the paper is developed in wet processing chemistry during the photofinishing of consumer images. In this invention, dry and wet strength resin are no longer needed as the strength of the paper is significantly improved when laminated with high strength biaxially oriented polymer sheets to the top and bottom of the cellulose paper.

Any pulps known in the art to provide image quality paper may be used in this invention along with the appropriate amount of kenaf fiber. Bleached hardwood chemical kraft pulp is preferred, as it provides brightness, an acceptable surface and good formation, while maintaining strength. Pulps with brightness of 90% or greater are commonly used in imaging supports because consumers typically prefer a white paper appearance.

The paper of this invention can be made on a standard continuous fourdrinier wire machine. For the formation of paper of this invention, it is necessary to refine the paper fibers to a high degree to obtain good formation. This is accomplished in this invention by providing wood fibers suspended in water, bringing said fibers into contact with a series of disc refining mixers and conical refining mixers such that fiber development in disc refining is carried out at a total specific net refining power of 40 to 80 KW hrs/metric ton, and cutting in the conical mixers is carried out at a total specific net refining power of between 40 and 90 KW hrs/metric ton, applying said fibers in water to a forming member to remove water, drying said paper between press and felt, drying said paper between cans, applying a size to said paper, drying said paper between steam heated dryer cans, applying steam to said paper, and passing said paper through calender rolls.

For the formation of cellulose paper of sufficient smoothness, it is desirable to rewet the paper surface prior to final calendering. Papers made on the paper machine with a high moisture content calender much more readily than papers of the same moisture content containing water added in a remoistening operation. This is due to partial irreversibility in imbition of water by cellulose. However, calendering a paper with high moisture content results in blackening, a condition of transparency resulting from fibers in contact with each other being crushed. The crushed areas reflect less light and, therefore, appear dark, a condition that is undesirable in an imaging application such as a base for color photographic paper. By adding moisture to the surface of the paper after the paper has been machine dried, the problem of blackening can be avoided while preserving the advantages of high moisture calendering. The addition of surface moisture prior to machine calendering is intended to soften the surface fibers and not the fibers in the interior of the paper. Papers calendered with a high surface moisture content generally show greater strength, density, gloss, and processing chemistry resistance, all of which are desirable for an imaging support and have been shown to be perceptually preferred to prior art photographic paper bases.

There are several paper surface humidification/moisturization techniques. The application of water, either by mechanical roller or aerosol mist by way of a electrostatic field, are two techniques known in the art. The above techniques require dwell time, hence web length, for the water to penetrate the surface and equalize in the top surface of the paper. Therefore, it is difficult for these above systems to make moisture corrections without distorting, spotting, and swelling of the paper. The preferred method to rewet the paper surface prior final calendering is by use of steam. A steam rewetting of the paper is accomplished by utilizing saturated steam in a controlled atmosphere to cause water vapor to penetrate the surface of the paper and condense. Prior to calendering, the steam rewetting allows a considerable improvement in gloss and smoothness of the paper due to the heating and moisturizing the paper of this invention before the pressure nip of the calendering rolls. An example of a commercially available system that allows for controlled steam moisturization of the surface of cellulose paper is the "Fluidex System" manufactured by Pagendarm Corp.

The preferred moisture content by weight after applying steam and calendering is between 7% and 9%. A moisture level less than 7% is more costly to manufacture since more fiber is needed to reach a final basis weight. At a moisture level greater than 10% the surface of the paper begins to degrade. After steaming the paper surface, the paper is calendered before winding of the paper. The preferred temperature of the calender rolls is between 76° C. and 88° C. Lower temperatures result in a poor surface. Higher temperatures are unnecessary, as they do not improve the paper surface and require more energy.

Because the development of the silver halide imaging layers requires submersion into wet processing chemistry, a water resistant coating applied to the paper is preferred, as the coating protects the cellulose paper from the wet development chemistry and improves the strength of the paper during the wet processing of the image layers. The preferred methods for providing a water resistant layer are melt cast polyolefin polymers, laminated polyolefin sheets, and laminated polyester sheets.

The polymer sheets preferably are an oriented polymer because of the strength and toughness developed in the orientation process of the polymer sheet. Preferred polymers for the polymer sheet include polyolefins, polyester, and nylon. Preferred polyolefins include polypropylene, polyethylene, polymethylpentene, polystyrene, polybutylene, and mixtures thereof. Polyolefin copolymers, including copolymers of propylene and ethylene such as hexene, butene, and octene are also useful. Polyolefins are preferred, as they are low in cost and have the desirable strength and toughness properties required for a pressure sensitive label. Oriented polymer sheets have been shown to improve the tear resistance of the base material, reduce the curl of the image element, and are generally capable of providing improved image sharpness and brightness compared to melt cast polymers. Examples of preferred biaxially oriented polymer sheets are disclosed in U.S. Pat. Nos. 5,866,282; 5,853,965; 5,874,205; 5,888,643; 5,888,683; 5,902,720 and 5,935,690. Further, the biaxially oriented sheets preferably laminated to cellulose paper, which are high in strength, have tear resistance greater than 150 N.

When white pigments are added to an oriented polymer layer, the polymer layer preferably includes a stabilizing amount of hindered amine extruded on the topside of the imaging layer substrate. Hindered amine light stabilizers (HALS) originate from 2,2,6,6-tetramethylpiperidine. The hindered amine should be added to the polymer layer at about 0.01–5% by weight of said resin layer in order to provide resistance to polymer degradation upon exposure to UV light. The preferred amount is at about 0.05–3% by weight. This provides excellent polymer stability and resistance to cracking and yellowing while keeping the expense of the hindered amine to a minimum. Examples of suitable hindered amines with molecular weights of less than 2300 are Bis(2,2,6,6-tetramethyl-4-piperidinyl)sebacate; Bis(1,2,2,6,6-pentamethyl-4-piperidinyl)sebacate, and Bis(1,2,2,6,6-pentamethyl-4-piperidinyl)2-n-butyl-(3,5-di-tert-butyl-hydroxy-benzyl)malonate.

Polyester polymers for the voided sheet of the invention are preferred, as the mechanical modulus of polyester is higher than that of polyolefin polymers resulting in a stiffer, more durable image element. Further, it has been shown that higher amounts of white pigments can be added to polyester compared to polyolefin polymer, thus allowing additional improvements in image sharpness, whiteness, and silver halide printing speed. Suitable dibasic acids useful for the preparation of polyesters include those containing from 2 to 16 carbon atoms such as adipic acid, sebacic acid, isophthalic acid, terephthalic acid, and the like. Alkyl esters of acids such as those listed above can also be employed. Other alcohols and acids, as well as polyesters prepared therefrom and the preparation of the polyesters, are described in U.S. Pat. Nos. 2,720,503 and 2,901,466.

When using a cellulose fiber paper support, it is preferable to extrusion laminate the oriented polymer sheets to the base paper using a polyolefin resin. Extrusion laminating is carried out by bringing together the biaxially oriented sheets of the invention and the base paper with application of an adhesive between them, followed by their being pressed in a nip such as between two rollers. The adhesive may be applied to either the biaxially oriented sheets or the base paper prior to their being brought into the nip. In a preferred form the adhesive is applied into the nip simultaneously with the biaxially oriented sheets and the base paper. The adhesive may be any suitable material that does not have a harmful effect upon the photographic element. A preferred material is polyethylene that is melted at the time it is placed into the nip between the paper and the biaxially oriented sheet.

In addition to white, opaque reflective water resistant layers applied to the cellulose paper of the invention, a waterproof layer that has a spectral transmission of between 40 and 70% is preferred. A spectral transmission between 40% and 70% is preferred, as the silver halide formed image can be utilized as a transmission display product where images are illuminated in light frames or boxes. Spectral transmission is the ratio of the transmitted power to the incident power and is expressed as a percentage as follows: $T_{RGB}=10^{-D}*100$ where D is the average of the red, green, and blue Status A transmission density response measured by an X-Rite model 310 (or comparable) photographic transmission densitometer.

As used herein, the phrase 'imaging element' comprises an imaging support as described above, along with an image receiving layer as applicable to multiple techniques governing the transfer of an image onto the imaging element. Such techniques include ink jet printing, thermal dye transfer, laser printing, or electrophotographic printing as well as a support for silver halide images. As used herein, the phrase "photographic element" is a material that utilizes photosensitive silver halide in the formation of images. The thermal dye image-receiving layer of the receiving elements of the invention may comprise, for example, a polycarbonate, a polyurethane, a polyester, polyvinyl chloride, poly(styrene-co-acrylonitrile), poly(caprolactone), or mixtures thereof. The dye image-receiving layer may be present in any amount that is effective for the intended purpose. In general, good results have been obtained at a concentration of from about 1 to about 10 $g/m^2$. An overcoat layer may be further coated over the dye-receiving layer, such as described in U.S. Pat No. 4,775,657 of Harrison et al.

Dye-donor elements that are used with a dye-receiving element utilizing the base of the invention conventionally comprise a support having thereon a dye containing layer. Any dye can be used in the dye-donor provided it is transferable to the dye-receiving layer by the action of heat. Especially good results have been obtained with sublimable dyes. Dye donors applicable for use in the present invention are described, e.g., in U.S. Pat. Nos. 4,916,112; 4,927,803 and 5,023,228.

As noted above, dye-donor elements are used to form a dye transfer image. Such a process comprises image-wise-heating a dye-donor element and transferring a dye image to a dye-receiving element as described above to form the dye transfer image.

In a preferred embodiment of the thermal dye transfer method of printing, a dye donor element is employed which compromises a poly-(ethylene terephthalate) support coated with sequential repeating areas of cyan, magenta, and yellow dye, and the dye transfer steps are sequentially performed for each color to obtain a three-color dye transfer image. Of course, when the process is only performed for a single color, then a monochrome dye transfer image is obtained.

Thermal printing heads which can be used to transfer dye from dye-donor elements to receiving elements utilizing the base of the invention are available commercially. There can be employed, for example, a Fujitsu Thermal Head (FTP-040 MCS001), a TDK Thermal Head F415 HH7-1089 or a Rohm Thermal Head KE 2008-F3. Alternatively, other known sources of energy for thermal dye transfer may be used, such as lasers as described in, for example, GB No. 2,083,726A.

A thermal dye transfer assemblage of the invention comprises (a) a dye-donor element and (b) a dye-receiving-element as described above, the dye-receiving element being in a superposed relationship with the dye-donor element so that the dye layer of the donor element is in contact with the dye image-receiving layer of the receiving element.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving element and the process repeated. The third color is obtained in the same manner.

The electrographic and electrophotographic processes and their individual steps have been well described in detail in many books and publications. The processes incorporate the basic steps of creating an electrostatic image, developing that image with charged, colored particles (toner), optionally transferring the resulting developed image to a secondary substrate, and fixing the image to the substrate. There are numerous variations in these processes and basic steps; the use of liquid toners in place of dry toners is simply one of those variations.

The first basic step, creation of an electrostatic image, can be accomplished by a variety of methods. The electrophotographic process of copiers uses imagewise photodischarge, through analog or digital exposure, of a uniformly charged photoconductor. The photoconductor may be a single-use system, or it may be rechargeable and reimageable, like those based on selenium or organic photorecptors.

In one form, the electrophotographic process of copiers uses imagewise photodischarge, through analog or digital exposure, of a uniformly charged photoconductor. The photoconductor may be a single-use system, or it may be rechargeable and reimageable like those based on selenium or organic photoreceptors.

In an alternate electrographic process, electrostatic images are created ionographically. The latent image is created on dielectric (charge-holding) medium, either paper or film. Voltage is applied to selected metal styli or writing nibs from an array of styli spaced across the width of the medium, causing a dielectric breakdown of the air between the selected styli and the medium. Ions are created, which form the latent image on the medium.

Electrostatic images, however generated, are developed with oppositely charged toner particles. For development with liquid toners, the liquid developer is brought into direct contact with the electrostatic image. Usually a flowing liquid is employed, to ensure that sufficient toner particles are available for development. The field created by the electrostatic image causes the charged particles, suspended in a nonconductive liquid, to move by electrophoresis. The charge of the latent electrostatic image is thus neutralized by the oppositely charged particles. The theory and physics of electrophoretic development with liquid toners are well described in many books and publications.

If a reimageable photoreceptor or an electrographic master is used, the toned image is transferred to paper (or other substrate). The paper is charged electrostatically, with the polarity chosen to cause the toner particles to transfer to the paper. Finally, the toned image is fixed to the paper. For self-fixing toners, residual liquid is removed from the paper by air-drying or heating. Upon evaporation of the solvent, these toners form a film bonded to the paper. For heat-fusible toners, thermoplastic polymers are used as part of the particle. Heating both removes residual liquid and fixes the toner to paper.

The dye receiving layer or DRL for ink jet imaging may be applied by any known methods such as solvent coating, or melt extrusion coating techniques. The DRL is coated over the tie layer or TL at a thickness ranging from 0.1–10 $\mu$m, preferably 0.5–5 $\mu$m. There are many known formulations which may be useful as dye receiving layers. The primary requirement is that the DRL is compatible with the inks which it will be imaged so as to yield the desirable color gamut and density. As the ink drops pass through the DRL, the dyes are retained or mordanted in the DRL, while the ink solvents pass freely through the DRL and are rapidly absorbed by the TL. Additionally, the DRL formulation is preferably coated from water, exhibits adequate adhesion to the TL, and allows for easy control of the surface gloss.

For example, Misuda et al in U.S. Pat. Nos. 4,879,166; 5,264,275; 5,104,730; 4,879,166, and Japanese patents 1,095,091; 2,276,671; 2,276,670; 4,267,180; 5,024,335; and 5,016,517 discloses aqueous based DRL formulations comprising mixtures of psuedo-bohemite and certain water soluble resins. Light, in U.S. Pat. Nos. 4,903,040; 4,930,041; 5,084,338; 5,126,194; 5,126,195; and 5,147,717 discloses aqueous-based DRL formulations comprising mixtures of vinyl pyrrolidone polymers and certain water-dispersible and/or water-soluble polyesters, along with other polymers and addenda. Butters et al. in U.S. Pat. Nos. 4,857,386 and 5,102,717 disclose ink-absorbent resin layers comprising mixtures of vinyl pyrrolidone polymers and acrylic or methacrylic polymers. Sato et al. in U.S. Pat. No. 5,194,317 and Higuma et al. in U.S. Pat. No. 5,059,983 disclose aqueous-coatable DRL formulations based on poly(vinyl alcohol). Iqbal in U.S. Pat. No. 5,208,092 discloses water-based IRL formulations comprising vinyl copolymers which are subsequently cross-linked. In addition to these examples, there may be other known or contemplated DRL formulations which are consistent with the aforementioned primary and secondary requirements of the DRL, all of which fall under the spirit and scope of the current invention.

The preferred DRL is a 0.1–10 micrometers DRL which is coated as an aqueous dispersion of 5 parts alumoxane and 5 parts poly(vinyl pyrrolidone). The DRL may also contain varying levels and sizes of matting agents for the purpose of controlling gloss, friction, and/or fingerprint resistance, surfactants to enhance surface uniformity and to adjust the surface tension of the dried coating, mordanting agents, antioxidants, UV absorbing compounds, light stabilizers, and the like.

Although the ink-receiving elements as described above can be successfully used to achieve the objectives of the present invention, it may be desirable to overcoat the DRL for the purpose of enhancing the durability of the imaged element. Such overcoats may be applied to the DRL either before or after the element is imaged. For example, the DRL can be overcoated with an ink-permeable layer through which inks freely pass. Layers of this type are described in U.S. Pat. Nos. 4,686,118; 5,027,131; and 5,102,717. Alternatively, an overcoat may be added after the element is imaged. Any of the known laminating films and equipment may be used for this purpose. The inks used in the aforementioned imaging process are well known, and the ink formulations are often closely tied to the specific processes, i.e., continuous, piezoelectric, or thermal. Therefore, depending on the specific ink process, the inks may contain widely differing amounts and combinations of solvents, colorants, preservatives, surfactants, humectants, and the like. Inks preferred for use in combination with the image recording elements of the present invention are water-based, such as those currently sold for use in the Hewlett-Packard Desk Writer 560C printer. However, it is intended that alternative embodiments of the image-recording elements as described above, which may be formulated for use with inks which are specific to a given ink-recording process or to a given commercial vendor, fall within the scope of the present invention.

Smooth opaque paper bases are useful in combination with silver halide images because the contrast range of the silver halide image is improved and show through of ambient light during image viewing is reduced. The photographic element of this invention is directed to a silver halide photographic element capable of excellent performance when exposed by either an electronic printing method or a conventional optical printing method. An electronic printing method comprises subjecting a radiation sensitive silver halide emulsion layer of a recording element to actinic radiation of at least $10^{-4}$ ergs/cm$^2$ for up to 100$\mu$ seconds duration in a pixel-by-pixel mode wherein the silver halide emulsion layer is comprised of silver halide grains as described above. A conventional optical printing method comprises subjecting a radiation sensitive silver halide emulsion layer of a recording element to actinic radiation of at least $10^{-4}$ ergs/cm$^2$ for $10^{-3}$ to 300 seconds in an imagewise mode wherein the silver halide emulsion layer is comprised of silver halide grains as described above.

This invention in a preferred embodiment utilizes a radiation-sensitive emulsion comprised of silver halide grains (a) containing greater than 50 mole percent chloride based on silver, (b) having greater than 50 percent of their surface area provided by {100} crystal faces, and (c) having a central portion accounting for from 95 to 99 percent of total silver and containing two dopants selected to satisfy each of the following class requirements: (i) a hexacoordination metal complex which satisfies the formula $$[ML_6]^n \quad (I)$$

wherein n is zero, −1, −2, −3, or −4; M is a filled frontier orbital polyvalent metal ion, other than iridium; and L6 represents bridging ligands which can be independently selected, provided that at least four of the ligands are anionic ligands, and at least one of the ligands is a cyano ligand or a ligand more electronegative than a cyano ligand; and (ii) an iridium coordination complex containing a thiazole or substituted thiazole ligand.

This invention is directed towards a photographic recording element comprising a support and at least one light sensitive silver halide-emulsion layer comprising silver halide grains as described above.

It has been discovered quite surprisingly that the combination of dopants (i) and (ii) provides greater reduction in reciprocity law failure than can be achieved with either dopant alone. Further, unexpectedly, the combination of dopants (i) and (ii) achieve reductions in reciprocity law failure beyond the simple additive sum achieved when employing either dopant class by itself. It has not been reported or suggested prior to this invention that the combination of dopants (i) and (ii) provides greater reduction in reciprocity law failure, particularly for high intensity and short duration exposures. The combination of dopants (i) and (ii) further unexpectedly achieves high intensity reciprocity with iridium at relatively low levels, and both high and low intensity reciprocity improvements even while using conventional gelatino-peptizer (e.g., other than low methionine gelatino-peptizer).

The base of the invention may be used in an electronic printing method which comprises subjecting a radiation sensitive silver halide emulsion layer of a recording element to actinic radiation of at least $10^{-4}$ ergs/cm$^2$ for up to 100$\mu$ seconds duration in a pixel-by-pixel mode. The present invention realizes an improvement in reciprocity failure by selection of the radiation sensitive silver halide emulsion layer. While certain embodiments of the invention are specifically directed towards electronic printing, use of the emulsions and elements of the invention is not limited to such specific embodiment, and it is specifically contemplated that the emulsions and elements of the invention are also well suited for conventional optical printing.

It has been found that significantly improved reciprocity performance can be obtained for silver halide grains (a) containing greater than 50 mole percent chloride, based on silver, and (b) having greater than 50 percent of their surface area provided by {100} crystal faces by employing a hexacoordination complex dopant of class (i) in combination with an iridium complex dopant comprising a thiazole or substituted thiazole ligand. The reciprocity improvement is obtained for silver halide grains employing conventional gelatino-peptizer, unlike the contrast improvement described for the combination of dopants set forth in U.S. Pat. Nos. 5,783,373 and 5,783,378, which requires the use of low methionine gelatino-peptizers as discussed therein, and which states it is preferable to limit the concentration of any gelatino-peptizer with a methionine level of greater than 30 micromoles per gram to a concentration of less than 1 percent of the total peptizer employed. Accordingly, in specific embodiments of the invention, it is specifically contemplated to use significant levels (i.e., greater than 1 weight percent of total peptizer) of conventional gelatin (e.g., gelatin having at least 30 micromoles of methionine per gram) as a gelatino-peptizer for the silver halide grains of the emulsions of the invention. In preferred embodiments of the invention, gelatino-peptizer is employed which comprises at least 50 weight percent of gelatin containing at least 30 micromoles of methionine per gram, as it is frequently desirable to limit the level of oxidized low methionine gelatin which may be used for cost and certain performance reasons.

It is contemplated to employ a class (i) hexacoordination complex dopant satisfying the formula:

$$[ML_6]^n \quad (I)$$

where n is zero, −1, −2, −3, or −4;

M is a filled frontier orbital polyvalent metal ion, other than iridium, preferably $Fe^{+2}$, $Ru^{+2}$, $Os^{+2}$, $Co^{+3}$, $Rh^{+3}$, $Pd^{+4}$ or $Pt^{+4}$, more preferably an iron, ruthenium or osmium ion, and most preferably a ruthenium ion;

$L_6$ represents six bridging ligands which can be independently selected, provided that at least four of the ligands are anionic ligands and at least one (preferably at least 3 and optimally at least 4) of the ligands is a cyano ligand or a ligand more electronegative than a cyano ligand. Any remaining ligands can be selected from among various other bridging ligands, including aquo ligands, halide ligands (specifically, fluoride, chloride, bromide and iodide), cyanate ligands, thiocyanate ligands, selenocyanate ligands, tellurocyanate ligands, and azide ligands. Hexacoordinated transition metal complexes of class (i) which include six cyano ligands are specifically preferred.

Illustrations of specifically contemplated class (i) hexacoordination complexes for inclusion in the high chloride grains are provided by Olm et al U.S. Pat. No. 5,503,970 and Daubendiek et al U.S. Pat. Nos. 5,494,789 and 5,503,971, and Keevert et al U.S. Pat. No. 4,945,035, as well as Murakami et al Japanese Patent Application Hei-2[1990]-249588, and *Research Disclosure* Item 36736. Useful neutral and anionic organic ligands for class (ii) dopant hexacoordination complexes are disclosed by Olm et al U.S. Pat. No. 5,360,712 and Kuromoto et al U.S. Pat. No. 5,462,849.

Class (i) dopant is preferably introduced into the high chloride grains after at least 50 (most preferably 75 and optimally 80) percent of the silver has been precipitated, but before precipitation of the central portion of the grains has been completed. Preferably class (i) dopant is introduced before 98 (most preferably 95 and optimally 90) percent of the silver has been precipitated. Stated in terms of the fully precipitated grain structure, class (i) dopant is preferably present in an interior shell region that surrounds at least 50 (most preferably 75 and optimally 80) percent of the silver and, with the more centrally located silver, accounts the entire central portion (99 percent of the silver), most preferably accounts for 95 percent, and optimally accounts for 90 percent of the silver halide forming the high chloride grains. The class (i) dopant can be distributed throughout the interior shell region delimited above or can be added as one or more bands within the interior shell region.

Class (i) dopant can be employed in any conventional useful concentration. A preferred concentration range is from $10^{-8}$ to $10^{-3}$ mole per silver mole, most preferably from $10^{-6}$ to $5\times10^{-4}$ mole per silver mole.

The following are specific illustrations of class (i) dopants:

(i-1) $[Fe(CN)_6]^{-4}$
(i-2) $[Ru(CN)_6]^{-4}$
(i-3) $[Os(CN)_6]^{-4}$ (i-4) $[Rh(CN)_6]^{-3}$
(i-5) $[Co(CN)_6]^{-3}$
(i-6) $[Fe(pyrazine)(CN)_5]^{-4}$
(i-7) $[RuCl(CN)_5]^{-4}$
(i-8) $[OsBr(CN)_5]^{-4}$
(i-9) $[RhF(CN)_5]^{-3}$
(i-10) $[In(NCS)_6]^{-3}$
(i-11) $[FeCO(CN)_5]^{-3}$
(i-12) $[RuF_2(CN)_4]^{-4}$
(i-13) $[OsCl_2(CN)_4]^{-4}$
(i-14) $[RhI_2(CN)_4]^{-3}$
(i-15) $[Ga(NCS)_6]^{-3}$
(i-16) $[Ru(CN)_5(OCN)]^{-4}$
(i-17) $[Ru(CN)_5(N_3)]^{-4}$
(i-18) $[Os(CN)_5(SCN)]^{-4}$
(i-19) $[Rh(CN)_5(SeCN)]^{-3}$
(i-20) $[Os(CN)Cl_5]^{-4}$
(i-21) $[Fe(CN)_3Cl_3]^{-3}$
(i-22) $[Ru(CO)_2(CN)_4]^{-1}$ When the class (i) dopants have a net negative charge, it is appreciated that they are associated with a counter ion when added to the reaction vessel during precipitation. The counter ion is of little importance, since it is ionically dissociated from the dopant in solution and is not incorporated within the grain. Common counter ions known to be fully compatible with silver chloride precipitation, such as ammonium and alkali metal ions, are contemplated. It is noted that the same comments apply to class (ii) dopants, otherwise described below.

The class (ii) dopant is an iridium coordination complex containing at least one thiazole or substituted thiazole ligand. Careful scientific investigations have revealed Group VIII hexahalo coordination complexes to create deep electron traps, as illustrated R. S. Eachus, R. E. Graves and M. T. Olm *J Chem. Phys.*, Vol. 69, pp. 4580–7 (1978) and *Physica Status Solidi A*, Vol. 57, 429–37 (1980) and R. S. Eachus and M. T. Olm *Annu. Rep. Prog. Chem. Sect. C. Phys. Chem.*, Vol. 83, 3, pp. 3–48 (1986). The class (ii) dopants employed in the practice of this invention are believed to create such deep electron traps. The thiazote ligands may be substituted with any photographically acceptable substituent which does not prevent incorporation of the dopant into the silver halide grain. Exemplary substituents include lower alkyl (e.g., alkyl groups containing 1–4 carbon atoms), and specifically methyl. A specific example of a substituted thiazole ligand which may be used in accordance with the invention is 5-methylthiazole. The class (ii) dopant preferably is an iridium coordination complex having ligands, each of which are more electropositive than a cyano ligand. In a specifically preferred form, the remaining non-thiazole or non-substituted-thiazole ligands of the coordination complexes forming class (ii) dopants are halide ligands.

It is specifically contemplated to select class (ii) dopants from among the coordination complexes containing organic ligands disclosed by Olm et al U.S. Pat. No. 5,360,712; Olm et al U.S. Pat. No. 5,457,021; and Kuromoto et al U.S. Pat. No. 5,462,849.

In a preferred form it is contemplated to employ as a class (ii) dopant a hexacoordination complex satisfying the formula:

$$[IrL^{i}_{6}]^{n'} \quad (II)$$

wherein n' is zero, −1, −2, −3 or −4; and $L^1_6$ represents six bridging ligands which can be independently selected, provided that at least four of the ligands are anionic ligands, each of the ligands is more electropositive than a cyano ligand, and at least one of the ligands comprises a thiazole or substituted thiazole ligand. In a specifically preferred form at least four of the ligands are halide ligands, such as chloride or bromide ligands.

Class (ii) dopant is preferably introduced into the high chloride grains after at least 50 (most preferably 85 and optimally 90) percent of the silver has been precipitated, but before precipitation of the central portion of the grains has been completed. Preferably class (ii) dopant is introduced before 99 (most preferably 97 and optimally 95) percent of the silver has been precipitated. Stated in terms of the fully precipitated grain structure, class (ii) dopant is preferably present in an interior shell region that surrounds at least 50 (most preferably 85 and optimally 90) percent of the silver and, with the more centrally located silver, accounts the entire central portion (99 percent of the silver), most preferably accounts for 97 percent, and optimally accounts for 95 percent of the silver halide forming the high chloride grains. The class (ii) dopant can be distributed throughout the interior shell region delimited above or can be added as one or more bands within the interior shell region.

Class (ii) dopant can be employed in any conventional useful concentration. A preferred concentration range is from $10^{-9}$ to $10^{-4}$ mole per silver mole. Iridium is most preferably employed in a concentration range of from $10^{-8}$ to $10^{-5}$ mole per silver mole.

Specific illustrations of class (ii) dopants are the following:

(ii-1) $[IrCl_5(thiazole)]^{-2}$
(ii-2) $[IrCl_4(thiazole)_2]^{-1}$
(ii-3) $[IrBr_5(thiazole)]^{-2}$
(ii-4) $[IrBr_4(thiazole)_2]^{-1}$
(ii-5) $[IrCl_5(5\text{-methylthiazole})]^{-2}$
(ii-6) $[IrCl_5(5\text{-methylthiazole})_2]^{-1}$
(ii-7) $[IrBr_5(5\text{-methylthiazole})]^{-2}$
(ii-8) $[IrBr_4(5\text{-methylthiazole})_2]^{-1}$ In one preferred aspect of the invention in a layer using a magenta dye forming coupler, a class (ii) dopant in combination with an $OsCl_5(NO)$ dopant has been found to produce a preferred result.

Emulsions demonstrating the advantages of the invention can be realized by modifying the precipitation of conventional high chloride silver halide grains having predominantly (>50%) {100} crystal faces by employing a combination of class (i) and (ii) dopants as described above.

The silver halide grains precipitated contain greater than 50 mole percent chloride, based on silver. Preferably the grains contain at least 70 mole percent chloride and, optimally at least 90 mole percent chloride, based on silver. Iodide can be present in the grains up to its solubility limit, which is in silver iodochloride grains, under typical conditions of precipitation, about 11 mole percent, based on silver. It is preferred for most photographic applications to limit iodide to less than 5 mole percent iodide, most preferably less than 2 mole percent iodide, based on silver.

Silver bromide and silver chloride are miscible in all proportions. Hence, any portion up to 50 mole percent of the total halide, not accounted for chloride and iodide, can be bromide. For color reflection print (i.e., color paper) uses bromide is typically limited to less than 10 mole percent based on silver and iodide is limited to less than 1 mole percent based on silver.

In a widely used form high chloride grains are precipitated to form cubic grains—that is, grains having {100} major faces and edges of equal length. In practice ripening effects usually round the edges and comers of the grains to some extent. However, except under extreme ripening conditions substantially more than 50 percent of total grain surface area is accounted for by {100} crystal faces.

High chloride tetradecahedral grains are a common variant of cubic grains. These grains contain 6 {100} crystal faces and 8 {111} crystal faces. Tetradecahedral grains are within the contemplation of this invention to the extent that greater than 50 percent of total surface area is accounted for by {100} crystal faces.

Although it is common practice to avoid or minimize the incorporation of iodide into high chloride grains employed in color paper, it is has been recently observed that silver iodochloride grains with {100} crystal faces and, in some instances, one or more {111} faces offer exceptional levels of photographic speed. In these emulsions, iodide is incorporated in overall concentrations of from 0.05 to 3.0 mole percent, based on silver, with the grains having a surface shell of greater than 50 Å that is substantially free of iodide and a interior shell having a maximum iodide concentration that surrounds a core accounting for at least 50 percent of total silver. Such grain structures are illustrated by Chen et al EPO 0 718 679.

In another improved form the high chloride grains can take the form of tabular grains having {100} major faces. Preferred high chloride {100} tabular grain emulsions are those in which the tabular grains account for at least 70 (most preferably at least 90) percent of total grain projected area. Preferred high chloride {100} tabular grain emulsions have average aspect ratios of at least 5 (most preferably at least >8). Tabular grains typically have thicknesses of less than 0.3 $\mu$m, preferably less than 0.2 $\mu$m, and optimally less than 0.07 $\mu$m. High chloride {100} tabular grain emulsions and their preparation are disclosed by Maskasky U.S. Pat. Nos. 5,264,337 and 5,292,632, House et al U.S. Pat. No. 5,320,938, Brust et al U.S. Pat. No. 5,314,798 and Chang et al U.S. Pat. No. 5,413,904.

Once high chloride grains having predominantly {100} crystal faces have been precipitated with a combination of class (i) and class (ii) dopants described above, chemical and spectral sensitization, followed by the addition of conventional addenda to adapt the emulsion for the imaging application of choice can take any convenient conventional form. These conventional features are illustrated by *Research Disclosure*, Item 38957, cited above, particularly:

III. Emulsion washing;
IV. Chemical sensitization;
V. Spectral sensitization and desensitization;
VII. Antifoggants and stabilizers;
VIII. Absorbing and scattering materials;
IX. Coating and physical property modifying addenda; and
X. Dye image formers and modifiers.

Some additional silver halide, typically less than 1 percent, based on total silver, can be introduced to facilitate chemical sensitization. It is also recognized that silver halide can be epitaxially deposited at selected sites on a host grain to increase its sensitivity. For example, high chloride {100} tabular grains with corner epitaxy are illustrated by Maskasky U.S. Pat. No. 5,275,930. For the purpose of providing a clear demarcation, the term "silver halide grain" is herein employed to include the silver necessary to form the grain up to the point that the final {100} crystal faces of the grain are formed. Silver halide later deposited that does not overlie the {100} crystal faces previously formed accounting for at least 50 percent of the grain surface area is excluded in determining total silver forming the silver halide grains. Thus, the silver forming selected site epitaxy is not part of the silver halide grains, while silver halide that deposits and provides the final {100} crystal faces of the grains is included in the total silver forming the grains, even when it differs significantly in composition from the previously precipitated silver halide.

Image dye-forming couplers may be included in the element such as couplers that form cyan dyes upon reaction with oxidized color developing agents which are described in such representative patents and publications as: U.S. Pat. Nos. 2,367,531; 2,423,730; 2,474,293; 2,772,162; 2,895,826; 3,002,836; 3,034,892; 3,041,236; 4,883,746 and "Farbkuppler—Eine Literature Ubersicht," published in Agfa Mitteilungen, Band III, pp. 156–175 (1961). Preferably such couplers are phenols and naphthols that form cyan dyes on reaction with oxidized color developing agent. Also preferable are the cyan couplers described in, for instance, European Patent Application Nos. 491,197; 544,322; 556,700; 556,777; 565,096; 570,006; and 574,948.

Typical cyan couplers are represented by the following formulas:

CYAN-1

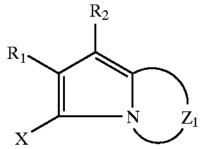

CYAN-2

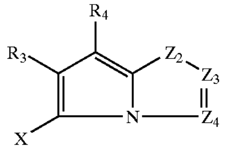

CYAN-3

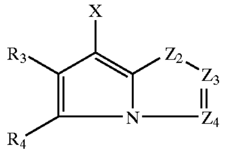

CYAN-4

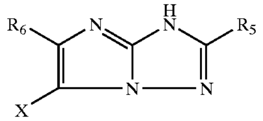

wherein $R_1$, $R_5$ and $R_8$ each represents a hydrogen or a substituent; $R_2$ represents a substituent; $R_3$, $R_4$ and $R_7$ each represents an electron attractive group having a Hammett's substituent constant $\sigma_{para}$ of 0.2 or more and the sum of the upara values of $R_3$ and $R_4$ is 0.65 or more; $R_6$ represents an electron attractive group having a Hammett's substituent constant $\sigma_{para}$ of 0.35 or more; X represents a hydrogen or a coupling-off group; $Z_1$ represents nonmetallic atoms necessary for forming a nitrogen-containing, 6-membered, heterocyclic ring which has at least one dissociative group; Z2 represents —C($R_7$)= and —N=; and $Z_3$ and $Z_4$ each represents —C($R_8$)= and —N=.

For purposes of this invention, an "NB coupler" is a dye-forming coupler which is capable of coupling with the developer 4-amino-3-methyl-N-ethyl-N-(2-methanesulfonamidoethyl)aniline sesquisulfate hydrate to form a dye for which the left bandwidth (LBW) of its absorption spectra upon "spin coating" of a 3% w/v solution of the dye in di-n-butyl sebacate solvent is at least 5 nm. less than the LBW for a 3% w/v solution of the same dye in acetonitrile. The LBW of the spectral curve for a dye is the distance between the left side of the spectral curve and the wavelength of maximum absorption measured at a density of half the maximum.

The "spin coating" sample is prepared by first preparing a solution of the dye in di-n-butyl sebacate solvent (3% w/v). If the dye is insoluble, dissolution is achieved by the addition of some methylene chloride. The solution is filtered and 0.1–0.2 ml is applied to a clear polyethylene terephthalate support (approximately 4 cm×4 cm) and spun at 4,000 RPM using the Spin Coating equipment, Model No. EC 101, available from Headway Research Inc., Garland Tex. The transmission spectra of the so prepared dye samples are then recorded.

Preferred "NB couplers" form a dye which, in n-butyl sebacate, has a LBW of the absorption spectra upon "spin coating" which is at least 15 nm, preferably at least 25 nm, less than that of the same dye in a 3% solution (w/v) in acetonitrile.

In a preferred embodiment the cyan dye-forming "NB coupler" useful in the invention has the formula (IA)

(IA)

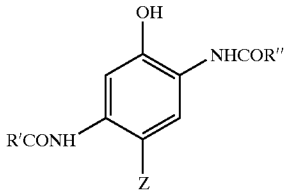

wherein

R' and R" are substituents selected such that the coupler is a "NB coupler", as herein defined; and Z is a hydrogen atom or a group which can be split off by the reaction of the coupler with an oxidized color developing agent.

The coupler of formula (IA) is a 2,5-diamido phenolic cyan coupler wherein the substituents R' and R" are preferably independently selected from unsubstituted or substituted alkyl, aryl, amino, alkoxy, and heterocyclyl groups.

In a further preferred embodiment, the "NB coupler" has the formula (I):

(I)

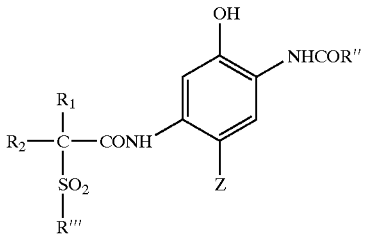

wherein

R" and R'" are independently selected from unsubstituted or substituted alkyl, aryl, amino, alkoxy, and heterocyclyl groups, and Z is as hereinbefore defined;

$R_1$ and $R_2$ are independently hydrogen or an unsubstituted or substituted alkyl group; and Typically, R" is an alkyl, amino or aryl group, suitably a phenyl group. R'" is desirably an alkyl or aryl group or a 5- to 10-membered heterocyclic ring which contains one or more heteroatoms selected from nitrogen, oxygen and sulfur, which ring group is unsubstituted or substituted.

In the preferred embodiment the coupler of formula (I) is a 2,5-diamido phenol in which the 5-amido moiety is an amide of a carboxylic acid which is substituted in the alpha position by a particular sulfone (—$SO_2$.) group, such as, for example, described in U.S. Pat. No. 5,686,235. The sulfone moiety is an unsubstituted or substituted alkylsulfone or a heterocyclyl sulfone, or it is an arylsulfone, which is preferably substituted, in particular in the meta and/or para position.

Couplers having these structures of formulae (I) or (IA) comprise cyan dye-forming "NB couplers" which form image dyes having very sharp-cutting dye hues on the short wavelength side of the absorption curves with absorption maxima ($\lambda_{max}$) which are shifted hypsochromically and are generally in the range of 620–645 nm, which is ideally suited for producing excellent color reproduction and high color saturation in color photographic papers.

Referring to formula (I), $R_1$ and $R_2$ are independently hydrogen or an unsubstituted or substituted alkyl group, preferably having from 1 to 24 carbon atoms and, in particular, 1 to 10 carbon atoms, suitably a methyl, ethyl, n-propyl, isopropyl, butyl or decyl group, or an alkyl group substituted with one or more fluoro, chloro or bromo atoms, such as a trifluoromethyl group. Suitably, at least one of $R_1$ and $R_2$ is a hydrogen atom and if only one of $R_1$ and $R_2$ is a hydrogen atom, then the other is preferably an alkyl group having 1 to 4 carbon atoms, more preferably one to three carbon atoms, and desirably two carbon atoms.

As used herein and throughout the specification unless where specifically stated otherwise, the term "alkyl" refers to an unsaturated or saturated straight or branched chain alkyl group, including alkenyl, and includes aralkyl and cyclic alkyl groups, including cycloalkenyl, having 3–8 carbon atoms, and the term 'aryl' includes specifically fused aryl.

In formula (I), R" is suitably an unsubstituted or substituted amino, alkyl or aryl group or a 5- to 10-membered heterocyclic ring which contains one or more heteroatoms selected from nitrogen, oxygen and sulfur, which ring is unsubstituted or substituted, but is more suitably an unsubstituted or substituted phenyl group.

Examples of suitable substituent groups for this aryl or heterocyclic ring include cyano, chloro, fluoro, bromo, iodo, alkyl- or aryl-carbonyl, alkyl- or aryl-oxycarbonyl, carbonamido, alkyl- or aryl-carbonamido, alkyl- or aryl-sulfonyl, alkyl- or aryl-sulfonyloxy, alkyl- or aryl-oxysulfonyl, alkyl- or aryl-sulfoxide, alkyl- or aryl-sulfamoyl, alkyl- or aryl-sulfonamido, aryl, alkyl, alkoxy, aryloxy, nitro, alkyl- or aryl-ureido and alkyl- or aryl-carbamoyl groups, any of which may be further substituted. Preferred groups are halogen, cyano, alkoxycarbonyl, alkylsulfamoyl, alkyl-sulfonamido, alkylsulfonyl, carbamoyl, alkylcarbamoyl or alkylcarbonamido. Suitably, R" is a 4-chlorophenyl, 3,4-di-chlorophenyl, 3,4-difluorophenyl, 4-cyanophenyl, 3-chloro-4-cyanophenyl, pentafluorophenyl, or a 3- or 4-sulfonamidophenyl group.

In formula (I), when R'" is alkyl, it may be unsubstituted or substituted with a substituent such as halogen or alkoxy. When R'" is aryl or a heterocycle, it may be substituted. Desirably, it is not substituted in the position alpha to the sulfonyl group.

In formula (I), when R'" is a phenyl group, it may be substituted in the meta and/or para positions with one to three substituents independently selected from the group consisting of halogen, and unsubstituted or substituted alkyl, alkoxy, aryloxy, acyloxy, acylamino, alkyl- or aryl-sulfonyloxy, alkyl- or aryl-sulfamoyl, alkyl- or aryl-sulfamoylamino, alkyl- or aryl-sulfonamido, alkyl-or aryl-ureido, alkyl- or aryl-oxycarbonyl, alkyl- or aryl-oxy-carbonylamino and alkyl- or aryl-carbamoyl groups.

In particular, each substituent may be an alkyl group such as methyl, t-butyl, heptyl, dodecyl, pentadecyl, octadecyl or 1,1,2,2-tetramethylpropyl; an alkoxy group such as methoxy, t-butoxy, octyloxy, dodecyloxy, tetradecyloxy, hexadecyloxy or octadecyloxy; an aryloxy group such as phenoxy, 4-t-butylphenoxy or 4-dodecyl-phenoxy; an alkyl- or aryl-acyloxy group such as acetoxy or dodecanoyloxy; an alkyl- or aryl-acylamino group such as acetamido, hexadecanamido or benzamido; an alkyl- or aryl-sulfonyloxy group such as methyl-sulfonyloxy, dodecylsulfonyloxy or 4-methylphenyl-sulfonyloxy; an alkyl- or aryl-sulfamoyl-group such as N-butylsulfamoyl or N-4-t-butylphenylsulfamoyl; an alkyl- or aryl-sulfamoylamino group such as N-butyl-sulfamoylamino or N-4-t-butylphenylsulfamoyl-amino; an alkyl- or aryl-sulfonamido group such as methane-sulfonamido, hexadecanesulfonamido or 4-chlorophenyl-sulfonamido; an alkyl- or aryl-ureido group such as methylureido or phenylureido; an alkoxy- or aryloxy-carbonyl such as methoxycarbonyl or phenoxycarbonyl; an alkoxy- or aryloxy-carbonylamino group such as methoxy-carbonylamino or phenoxycarbonylamino; an alkyl or aryl-carbamoyl group such as N-butylcarbamoyl or N-methyl-N-dodecylcarbamoyl; or a perfluoroalkyl group such as trifluoromethyl or heptafluoropropyl.

Suitably, the above substituent groups have 1 to 30 carbon atoms, more preferably 8 to 20 aliphatic carbon atoms. A desirable substituent is an alkyl group of 12 to 18 aliphatic carbon atoms such as dodecyl, pentadecyl, or octadecyl, or an alkoxy group with 8 to 18 aliphatic carbon atoms such as dodecyloxy and hexadecyloxy, or a halogen such as a meta or para chloro group, carboxy, or sulfonamido. Any such groups may contain interrupting heteroatoms such as oxygen to form, e.g., polyalkylene oxides.

In formula (I) or (IA), Z is a hydrogen atom or a group which can be split off by the reaction of the coupler with an oxidized color developing agent, known in the photographic art as a 'coupling-off group' and may preferably be hydrogen, chloro, fluoro, substituted aryloxy, or mercaptotetrazole, more preferably hydrogen or chloro.

The presence or absence of such groups determines the chemical equivalency of the coupler, i.e., whether it is a 2-equivalent or 4-equivalent coupler, and its particular identity can modify the reactivity of the coupler. Such groups can advantageously affect the layer in which the coupler is coated, or other layers in the photographic recording material, by performing, after release from the coupler, functions such as dye formation, dye hue adjustment, development acceleration or inhibition, bleach acceleration or inhibition, electron transfer facilitation, color correction, and the like.

Representative classes of such coupling-off groups include, for example, halogen, alkoxy, aryloxy, heterocyclyloxy, sulfonyloxy, acyloxy, acyl, heterocyclylsulfonamido, heterocyclylthio, benzothiazolyl, phosophonyloxy, alkylthio, arylthio, and arylazo. These coupling-off groups are described in the art, for example, in U.S. Pat. Nos. 2,455,169; 3,227,551; 3,432,521; 3,467,563; 3,617,291; 3,880,661; 4,052,212; and 4,134,766; and in U.K. Patent Nos. and published applications 1,466,728; 1,531,927; 1,533,039; 2,066,755A, and 2,017,704A. Halogen, alkoxy, and aryloxy groups are most suitable.

Examples of specific coupling-off groups are —Cl, —F, —Br, —SCN, —$OCH_3$, —$OC_6H_5$, —$OCH_2C(=O)NHCH_2CH_2OH$, —$OCH_2C(O)NHCH_2CH_2OCH_3$, —$OCH_2C(O)NHCH_2CH_2OC(=O)OCH_3$, —$P(=O)(OC_2H_5)_2$, —$SCH_2CH_2COOH$,

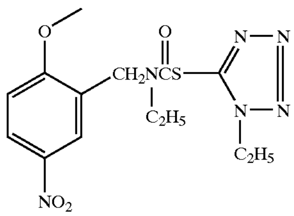

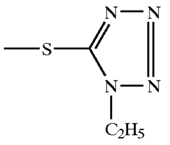

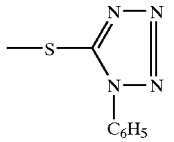

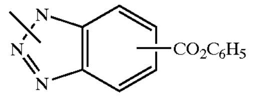

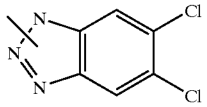

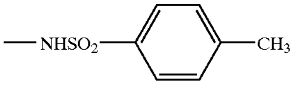

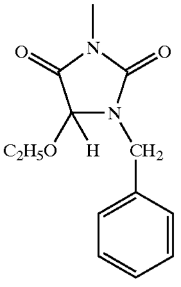

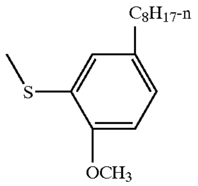

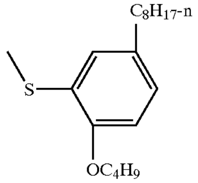

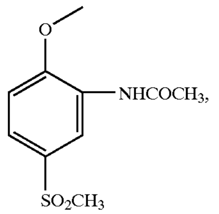

and

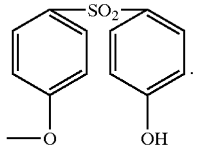

Typically, the coupling-off group is a chlorine atom, hydrogen atom or p-methoxyphenoxy group.

It is essential that the substituent groups be selected so as to adequately ballast the coupler and the resulting dye in the organic solvent in which the coupler is dispersed. The ballasting may be accomplished by providing hydrophobic substituent groups in one or more of the substituent groups. Generally a ballast group is an organic radical of such size and configuration as to confer on the coupler molecule sufficient bulk and aqueous insolubility as to render the coupler substantially nondiffusible from the layer in which it is coated in a photographic element. Thus, the combination of substituent are suitably chosen to meet these criteria. To be effective, the ballast will usually contain at least 8 carbon atoms and typically contains 10 to 30 carbon atoms. Suitable ballasting may also be accomplished by providing a plurality of groups which in combination meet these criteria. In the preferred embodiments of the invention, $R_1$ in formula (I) is a small alkyl group or hydrogen. Therefore, in these embodiments the ballast would be primarily located as part of the other groups. Furthermore, even if the coupling-off group Z contains a ballast, it is often necessary to ballast the other substituents as well, since Z is eliminated from the molecule upon coupling; thus, the ballast is most advantageously provided as part of groups other than Z.

The following examples further illustrate preferred coupler of the invention. It is not to be construed that the present invention is limited to these examples.

IC-1

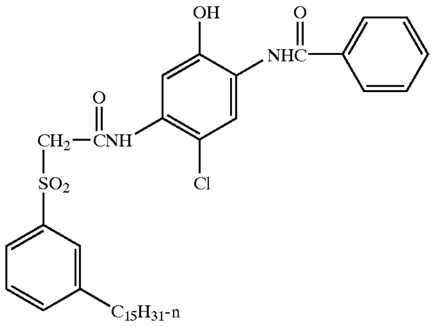

IC-2

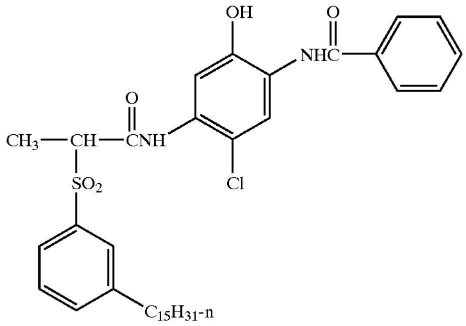

IC-3

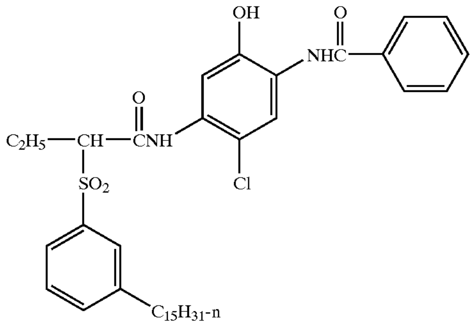

IC-4

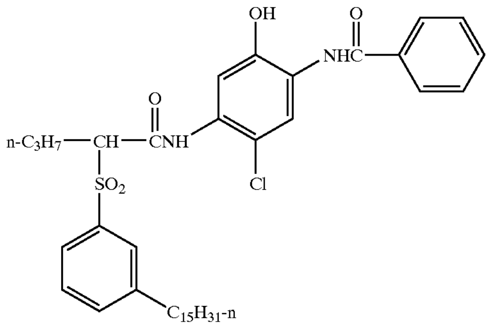

-continued

IC-5

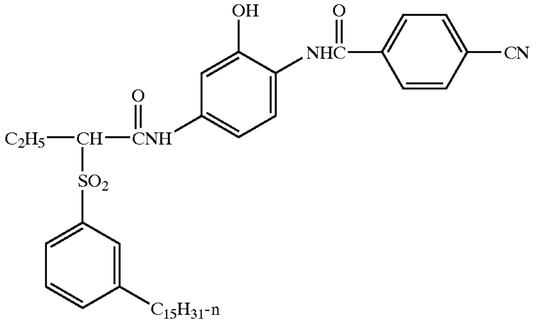

IC-6

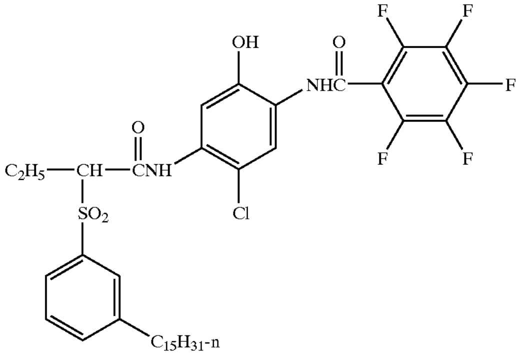

IC-7

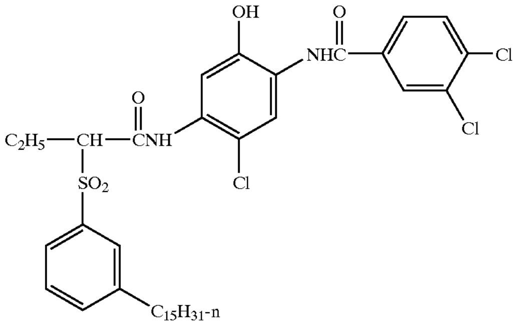

IC-8

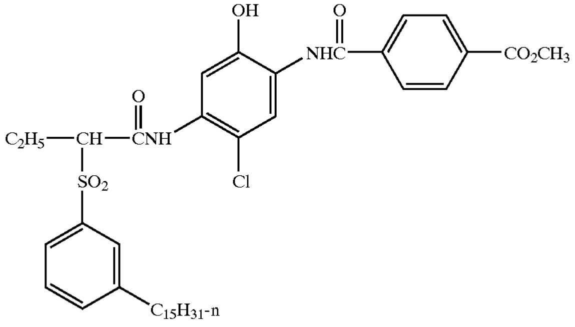

-continued
IC-9
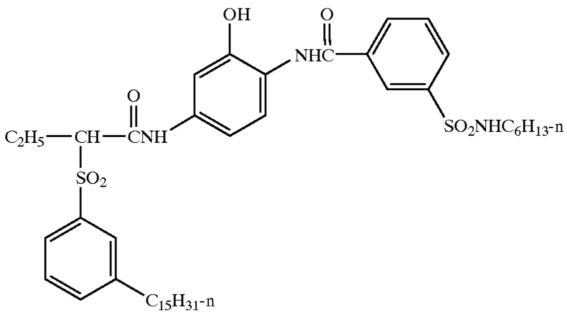
IC-10
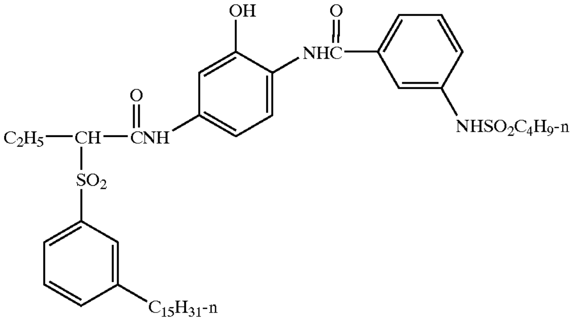
IC-11
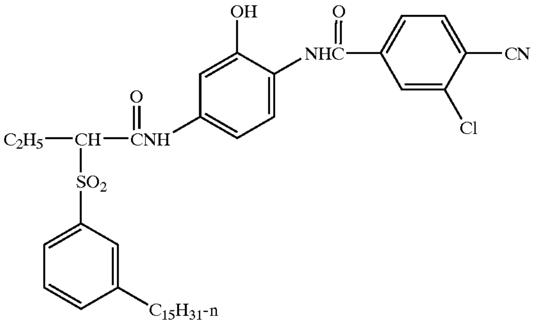
IC-12
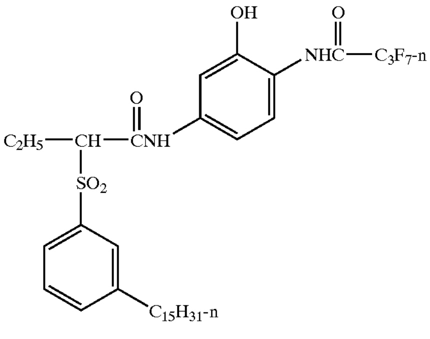
-continued
IC-13
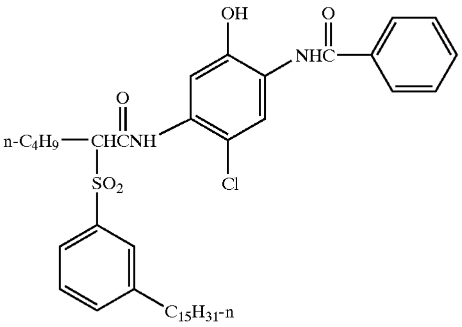
IC-14
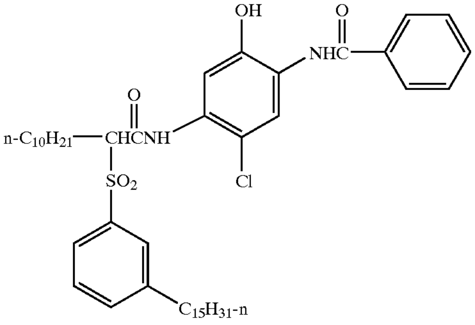
IC-15
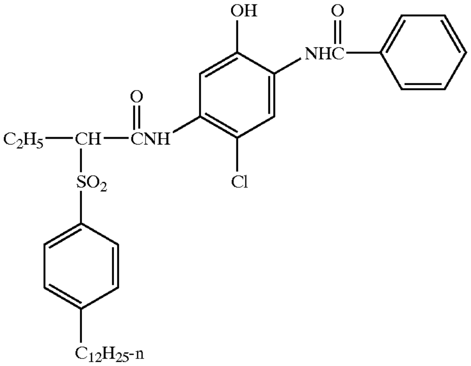
IC-16
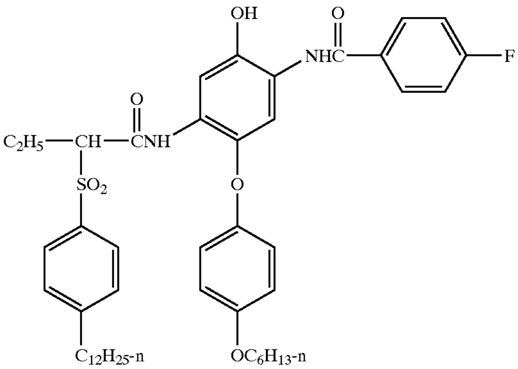

-continued
IC-17
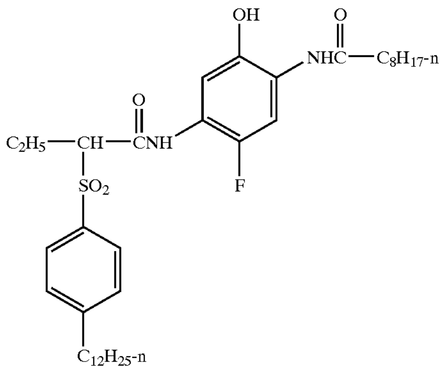
IC-18
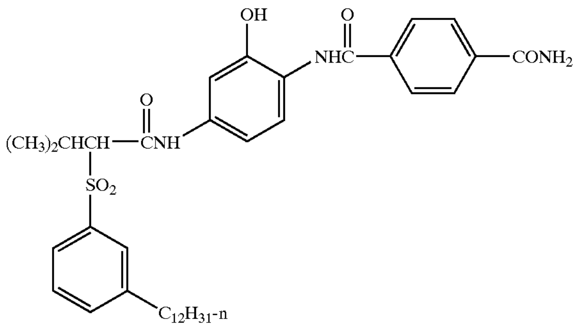
IC-19
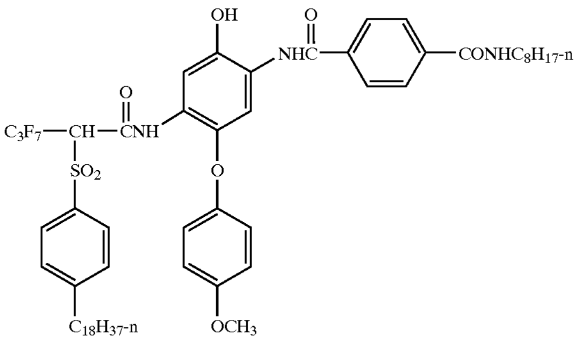
IC-20
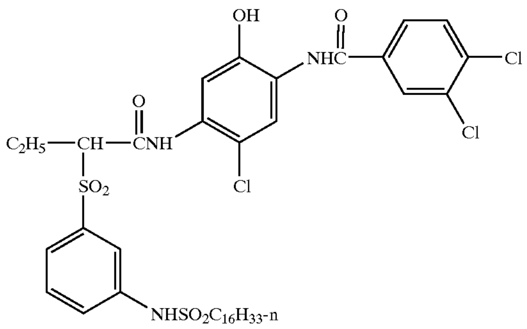
-continued
IC-21
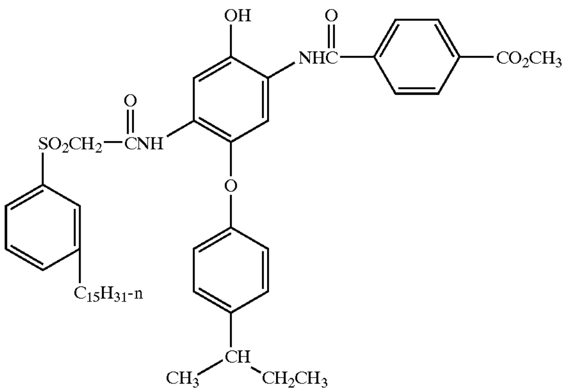
IC-22
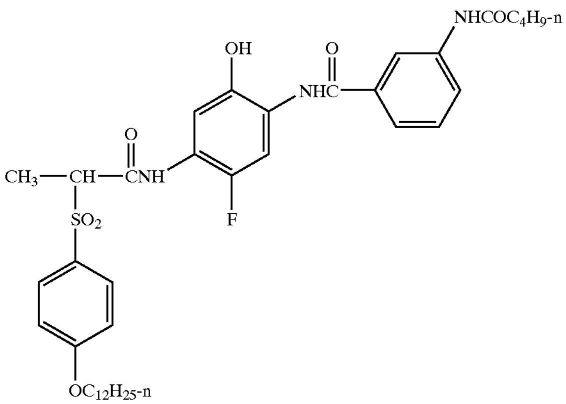
IC-23
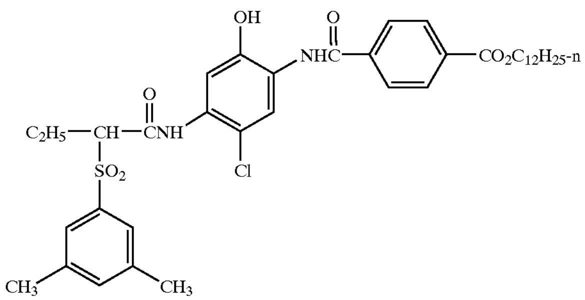
IC-24
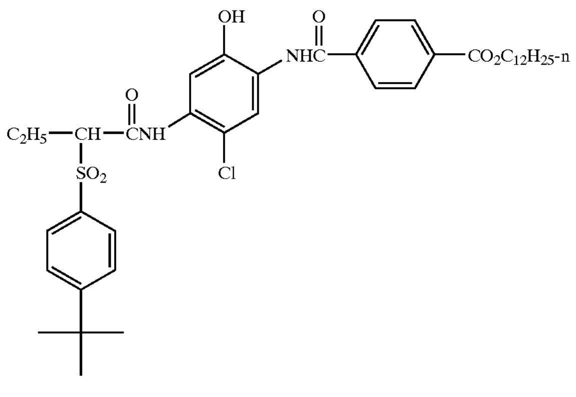

-continued
IC-25
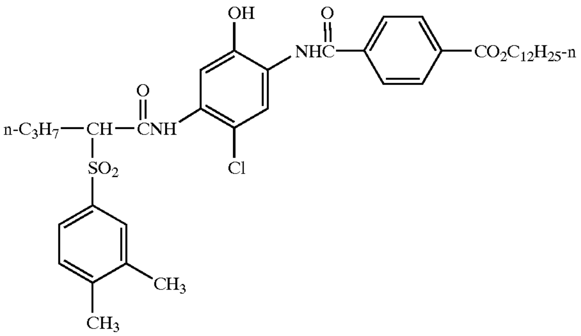
IC-26
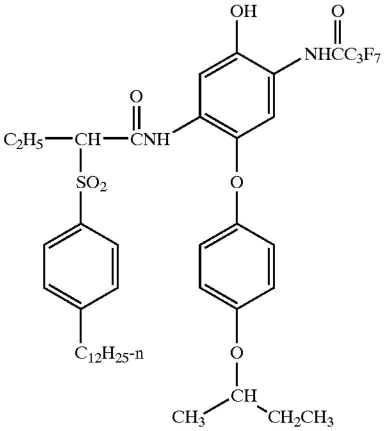
IC-27
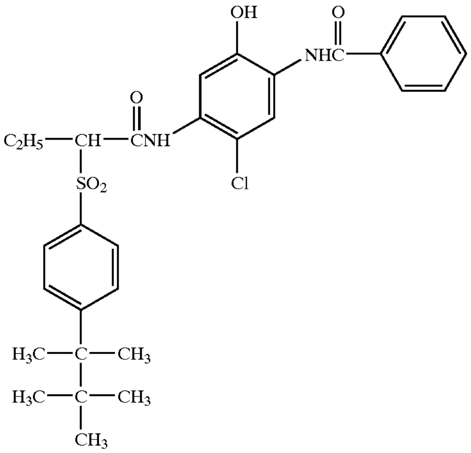
IC-28
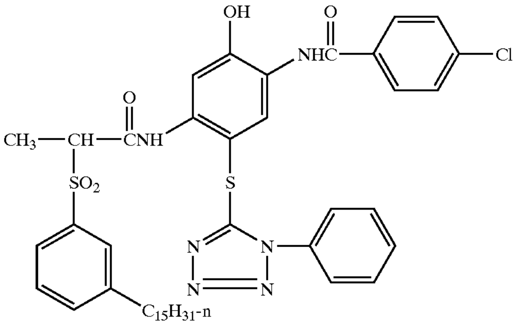
-continued
IC-29
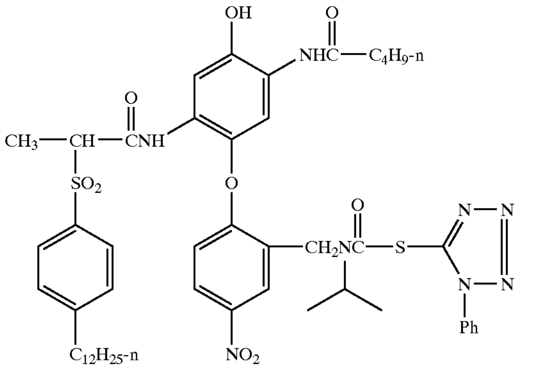
IC-30
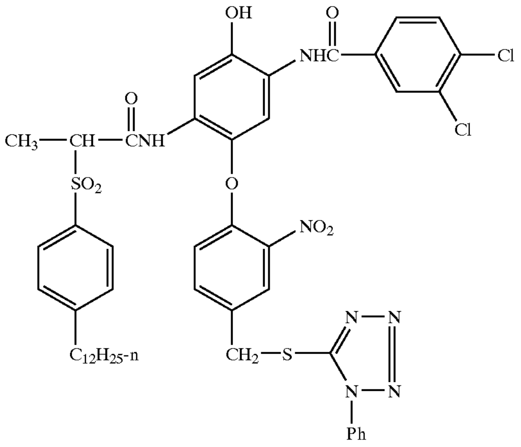
IC-31
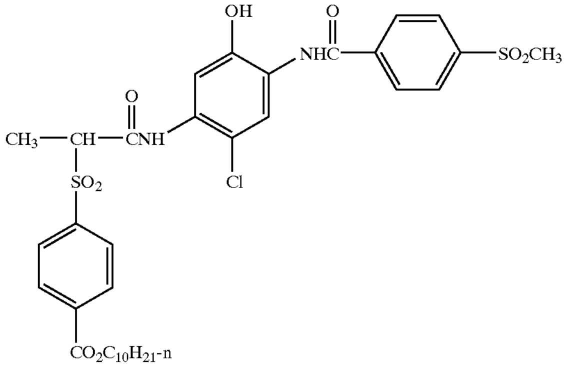
IC-32
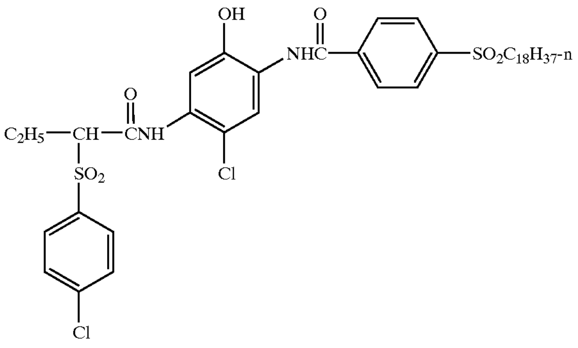

-continued
IC-33
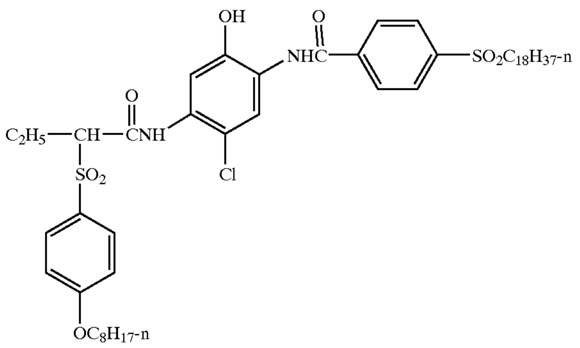
IC-34
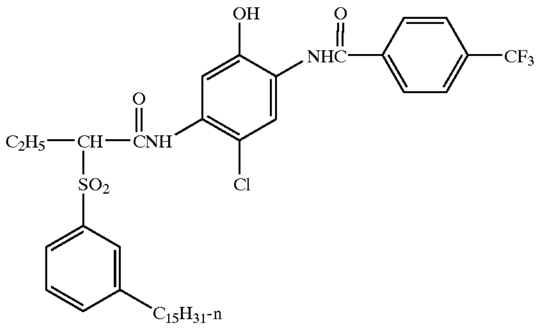
IC-35
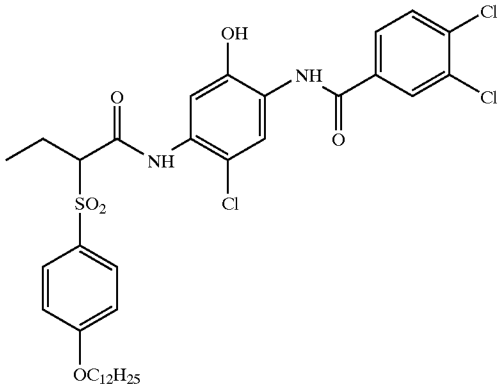
IC-36
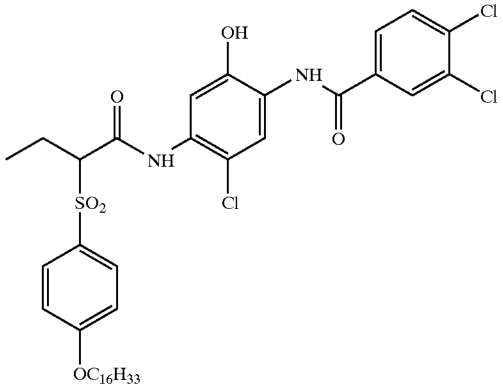
-continued
IC-37
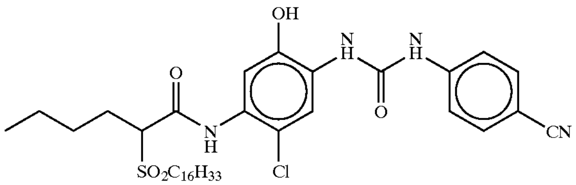
IC-38
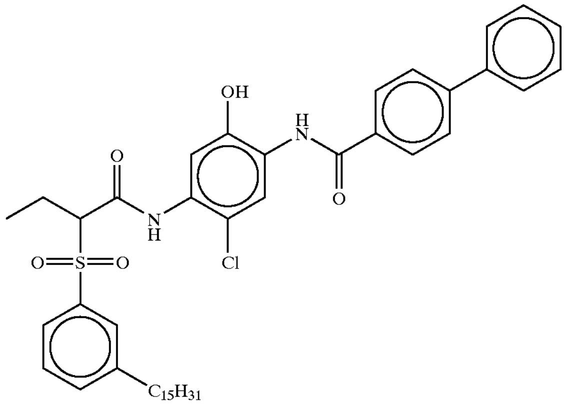
IC-39
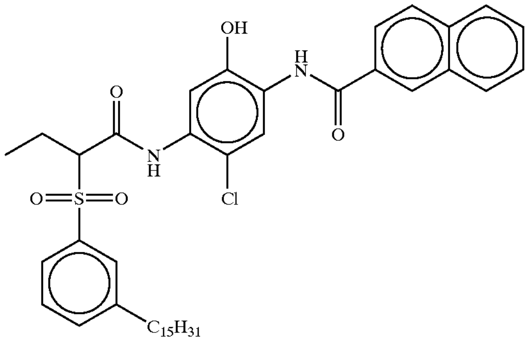
IC-40
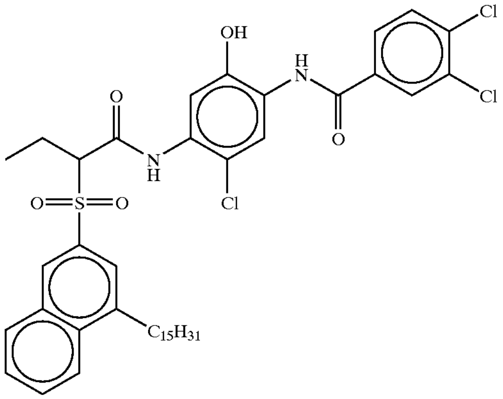
Preferred couplers are IC-3, IC-7, IC-35, and IC-36 because of their suitably narrow left bandwidths.
Couplers that form magenta dyes upon reaction with oxidized color developing agent are described in such representative patents and publications as: U.S. Pat. Nos. 2,311,082; 2,343,703; 2,369,489; 2,600,788; 2,908,573; 3,062, 653; 3,152,896; 3,519,429; 3,758,309; and "Farbkuppler-eine Literature Ubersicht," published in Agfa Mitteilungen, Band III, pp. 126–156 (1961). Preferably such couplers are pyrazolones, pyrazolotriazoles, or pyrazolobenzimidazoles that form magenta dyes upon reaction with oxidized color developing agents. Especially preferred couplers are 1H-pyrazolo[5,1-c]-1,2,4-triazole and 1H-pyrazolo [1,5-b]-1,2,4-triazole. Examples of 1H-pyrazolo [5,1-c]-1,2,4-triazole couplers are described in U.K. Patent Nos. 1,247,493; 1,252,418; 1,398,979; U.S. Pat. Nos. 4,443,536; 4,514,490; 4,540,654; 4,590,153; 4,665,015; 4,822,730; 4,945,034; 5,017,465; and 5,023,170. Examples of 1H-pyrazolo [1,5-b]-1,2,4-triazoles can be found in European Patent applications 176,804 and 177,765; U.S. Pat. Nos. 4,659,652; 5,066,575; and 5,250,400.

Typical pyrazoloazole and pyrazolone couplers are represented by the following formulas:

MAGENTA-1

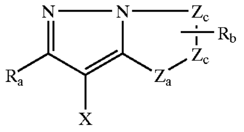

MAGENTA-2

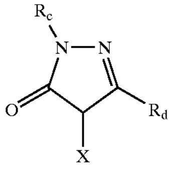

wherein $R_a$ and $R_b$ independently represents H or a substituent; $R_c$ is a substituent (preferably an aryl group); $R_d$ is a substituent (preferably an anilino, carbonamido, ureido, carbamoyl, alkoxy, aryloxycarbonyl, alkoxycarbonyl, or N-heterocyclic group); X is hydrogen or a coupling-off group; and $Z_a$, $Z_b$, and $Z_c$ are independently a substituted methine group, =N—, =C—, or —NH—, provided that one of either the $Z_a$—$Z_b$ bond or the $Z_b$—$Z_c$ bond is a double bond and the other is,a single bond, and when the $Z_b$—$Z_c$ bond is a carbon-carbon double bond, it may form part of an aromatic ring, and at least one of $Z_a$, $Z_b$, and $Z_c$ represents a methine group connected to the group $R_b$.

Specific examples of such couplers are:

M-1

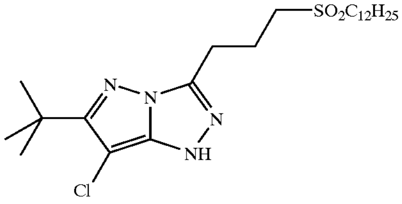

-continued

M-2

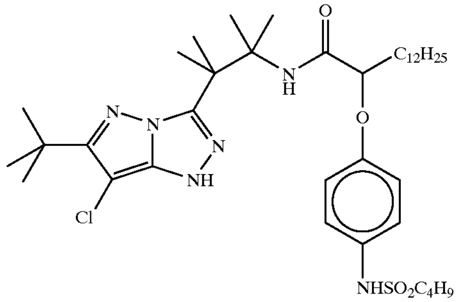

M-3

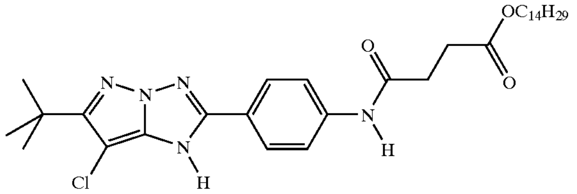

M-4

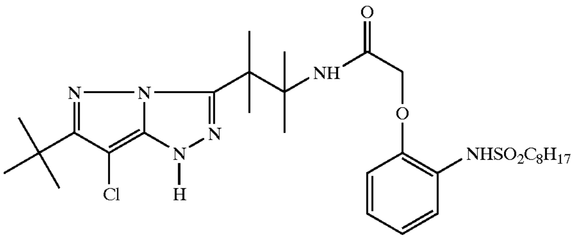

M-5

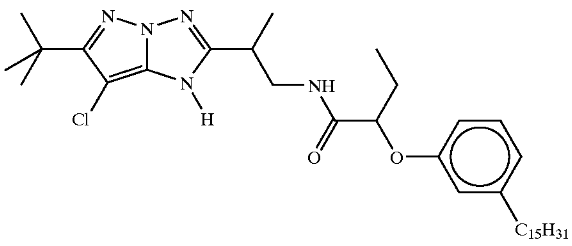

Couplers that form yellow dyes upon reaction with oxidized color developing agent are described in such representative patents and publications as: U.S. Pat. Nos. 2,298,443; 2,407,210; 2,875,057; 3,048,194; 3,265,506; 3,447,928; 3,960,570; 4,022,620; 4,443,536; 4,910,126; and 5,340,703 and "Farbkuppler-eine Literature Ubersicht," published in Agfa Mitteilungen, Band III, pp. 112–126 (1961). Such couplers are typically open chain ketomethylene compounds. Also preferred are yellow couplers such as described in, for example, European Patent Application Nos. 482,552; 510,535; 524,540; 543,367; and U.S. Pat. No. 5,238,803. For improved color reproduction, couplers which give yellow dyes that cut off sharply on the long wavelength side are particularly preferred (for example, see U.S. Pat. No. 5,360,713).

Typical preferred yellow couplers are represented by the following formulas:

YELLOW-1

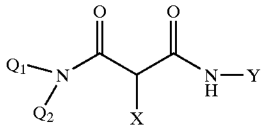

YELLOW-2

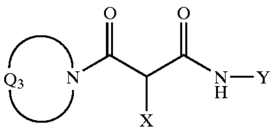

YELLOW-3

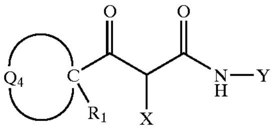

YELLOW-4

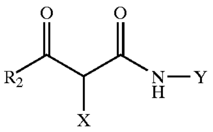

wherein $R_1$, $R_2$, $Q_1$ and $Q_2$ each represents a substituent; X is hydrogen or a coupling-off group; Y represents an aryl group or a heterocyclic group; $Q_3$ represents an organic residue required to form a nitrogen-containing heterocyclic group together with the >N—; and $Q_4$ represents nonmetallic atoms necessary to from a 3- to 5-membered hydrocarbon ring or a 3- to 5-membered heterocyclic ring which contains at least one hetero atom selected from N, O, S, and P in the ring. Particularly preferred is when $Q_1$ and $Q_2$ each represents an alkyl group, an aryl group, or a heterocyclic group, and $R_2$ represents an aryl or tertiary alkyl group.

Preferred yellow couplers can be of the following general structures:

Y-1

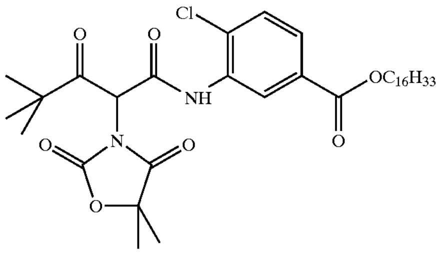

Y-2

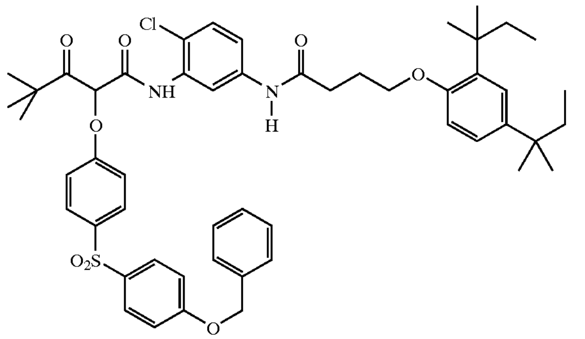

-continued

Y-3

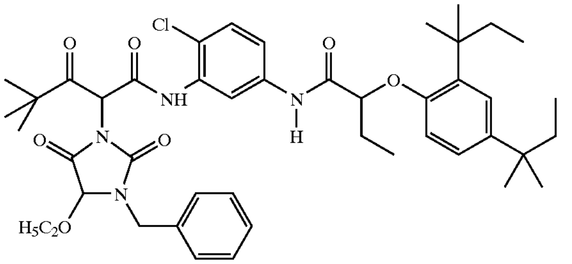

Y-4

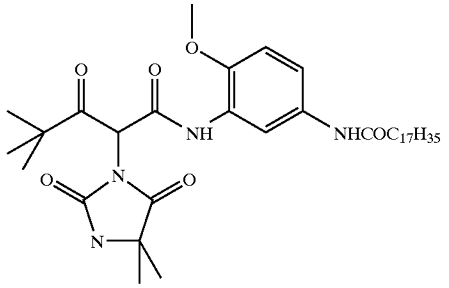

Y-5

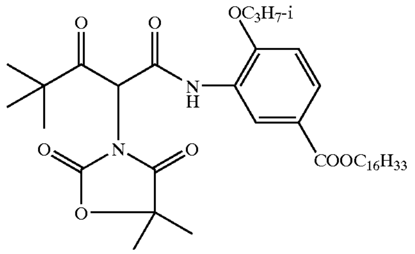

Y-6

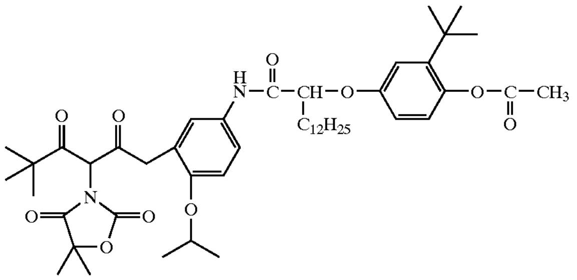

Unless otherwise specifically stated, substituent groups which may be substituted on molecules herein include any groups, whether substituted or unsubstituted, which do not destroy properties necessary for photographic utility. When the term "group" is applied to the identification of a substituent containing a substitutable hydrogen, it is intended to encompass not only the sub stituent's unsubstituted form, but also its form further substituted with any group or groups as herein mentioned. Suitably, the group may be halogen or may be bonded to the remainder of the molecule by an atom of carbon, silicon, oxygen, nitrogen, phosphorous, or sulfur. The substituent may be, for example, halogen, such as chlorine, bromine or fluorine; nitro; hydroxyl; cyano; carboxyl; or groups which may be further substituted, such as alkyl, including straight- or branched-chain alkyl, such as methyl, trifluoromethyl, ethyl, t-butyl, 3-(2,4-di-t-pentylphenoxy) propyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy, 2-(2,4-di-t-pentylphenoxy)

ethoxy, and 2-dodecyloxyethoxy; aryl such as phenyl, 4-t-butylphenyl, 2,4,6-trimethylphenyl, naphthyl; aryloxy, such as phenoxy, 2-methylphenoxy, alpha- or beta-naphthyloxy, and 4-tolyloxy; carbonamido, such as acetamido, benzamido, butyramido, tetradecanamido, alpha-(2,4-di-t-pentyl-phenoxy)acetamido, alpha-(2,4-di-t-pentylphenoxy) butyramido, alpha-(3-pentadecylphenoxy)-hexanamido, alpha-(4-hydroxy-3-t-butylphenoxy)-tetradecanamido, 2-oxo-pyrrolidin-1-yl, 2-oxo-5-tetradecylpyrrolin-1-yl, N-methyltetradecanamido, N-succinimido, N-phthalimido, 2,5-dioxo-1-oxazolidinyl, 3-dodecyl-2,5-dioxo-1-imidazolyl, and N-acetyl -N-dodecylamino, ethoxycarbonylamino, phenoxycarbonylamino, benzyloxycarbonylamino, hexadecyloxycarbonylamino, 2,4-di-t-butylphenoxycarbonylamino, phenylcarbonylamino, 2,5-(di-t-pentylphenyl) carbonylamino, p-dodecyl-phenylcarbonylamino, p-toluylcarbonylamino, N-methylureido, N,N-dimethylureido, N-methyl-N-dodecylureido, N-hexadecylureido, N,N-dioctadecylureido, N,N-dioctyl-N'-ethylureido, N-phenylureido, N,N-diphenylureido, N-phenyl-N-p-toluylureido, N-(m-hexadecylphenyl)ureido, N,N-(2,5-di-t-pentylphenyl)-N'-ethylureido, and t-butylcarbonamido; sulfonamido, such as methylsulfonamido, benzenesulfonamido, p-toluylsulfonamido, p-dodecylbenzenesulfonamido, N-methyltetradecylsulfonamido, N,N-dipropyl-sulfamoylamino, and hexadecylsulfonamido; sulfamoyl, such as N-methylsulfamoyl, N-ethylsulfamoyl, N,N-dipropylsulfamoyl, N-hexadecylsulfamoyl, N,N-dimethylsulfamoyl; N-[3-(dodecyloxy)propyl]sulfamoyl, N-[4-(2,4-di-t-pentylphenoxy)butyl]sulfamoyl, N-methyl-N-tetradecylsulfamoyl, and N-dodecylsulfamoyl; carbamoyl, such as N-methylcarbamoyl, N,N-dibutylcarbamoyl, N-octadecylcarbamoyl, N-[4-(2,4-di-t-pentylphenoxy)butyl]carbamoyl, N-methyl-N-tetradecylcarbamoyl, and N,N-dioctylcarbamoyl; acyl, such as acetyl, (2,4-di-t-amylphenoxy)acetyl, phenoxycarbonyl, p-dodecyloxyphenoxycarbonyl, methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexylsulfonyl, dodecylsulfonyl, hexadecylsulfonyl, phenylsulfonyl, 4-nonylphenylsulfonyl, and p-toluylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfinyl, 4-nonylphenylsulfinyl, and p-toluyisulfinyl; thio, such as ethylthio, octylthio, benzylthio, tetradecylthio, 2-(2,4-di-t-pentylphenoxy) ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy; amino, such as phenylanilino, 2-chloroanilino, diethylamino, dodecylamino; imino, such as 1 (N-phenylimido)ethyl, N-succinimido or 3-benzylhydantoinyl; phosphate, such as dimethylphosphate and ethylbutylphosphate; phosphite, such as diethyl and dihexylphosphite; a heterocyclic group, a heterocyclic oxy group or a heterocyclic thio group, each of which may be substituted and which contain a 3- to 7-membered heterocyclic ring composed of carbon atoms and at least one hetero atom selected from the group consisting of oxygen, nitrogen and sulfur, such as 2-furyl, 2-thienyl, 2-benzimidazolyloxy or 2-benzothiazolyl; quaternary ammonium, such as triethylammonium; and silyloxy, such as trimethylsilyloxy.

If desired, the substituents may themselves be further substituted one or more times with the described substituent groups. The particular substituents used may be selected by those skilled in the art to attain the desired photographic properties for a specific application and can include, for example, hydrophobic groups, solubilizing groups, blocking groups, releasing, or releasable groups, etc. Generally, the above groups and substituents thereof may include those having up to 48 carbon atoms, typically 1 to 36 carbon atoms and usually less than 24 carbon atoms, but greater numbers are possible depending on the particular substituents selected.

Representative substituents on ballast groups include alkyl, aryl, alkoxy, aryloxy, alkylthio, hydroxy, halogen, alkoxycarbonyl, aryloxcarbonyl, carboxy, acyl, acyloxy, amino, anilino, carbonamido, carbamoyl, alkylsulfonyl, arylsulfonyl, sulfonamido, and sulfarnoyl groups wherein the substituents typically contain 1 to 42 carbon atoms. Such substituents can also be further substituted.

Stabilizers and scavengers that can be used in these photographic elements, but are not limited to, the following.

ST-1

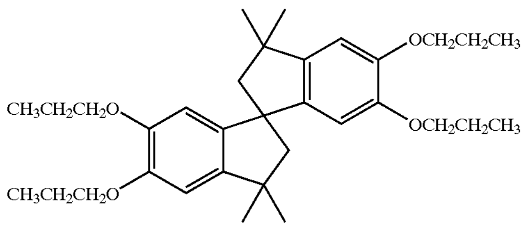

ST-2

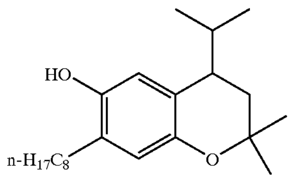

ST-3

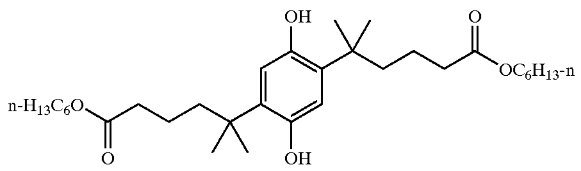

ST-4

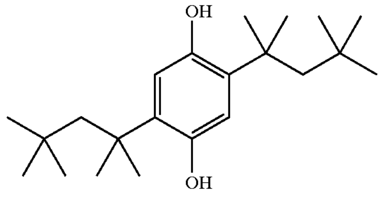

ST-5

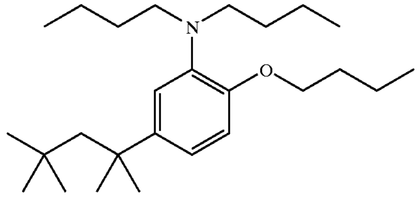

-continued
ST-6
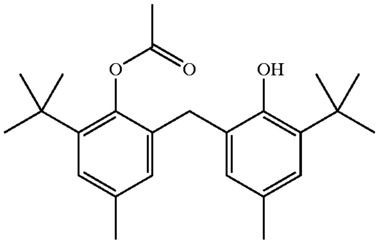
ST-7
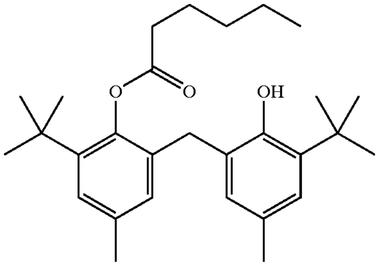
ST-8
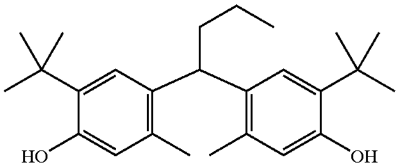
ST-9
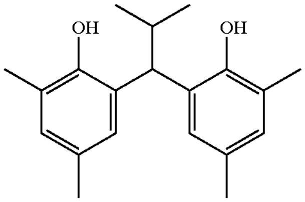
ST-10
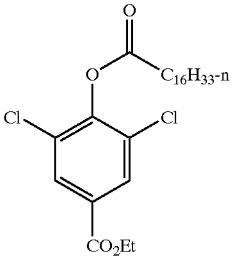
ST-11
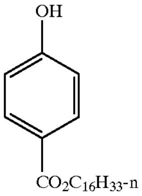
ST-12
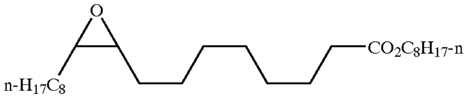
-continued
ST-13
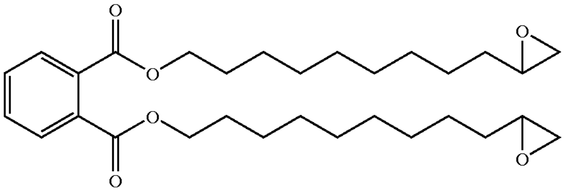
ST-14
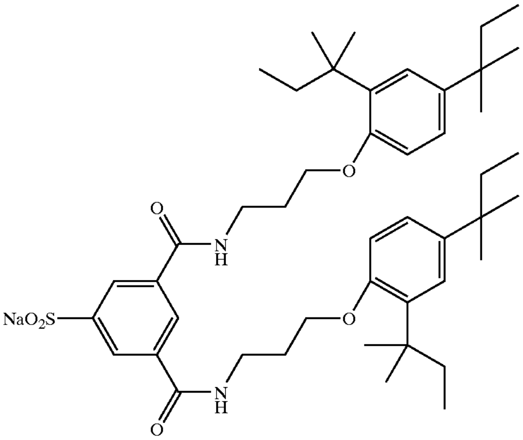
ST-15
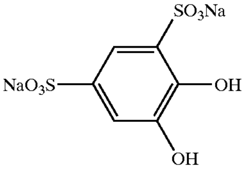
ST-16
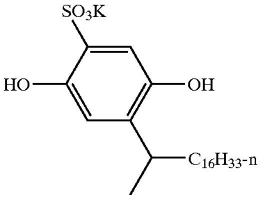
ST-17
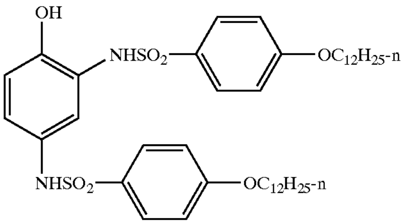
ST-18
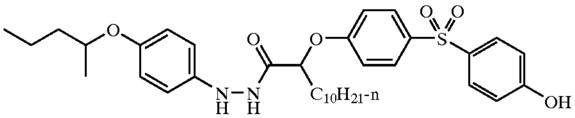
ST-19
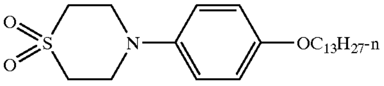

-continued

ST-20

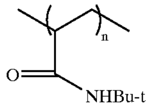

n = 75–8,000

ST-21

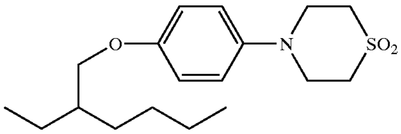

ST-22

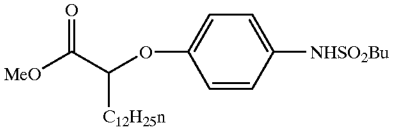

ST-23

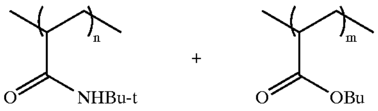

n:m 1:1 mw = 75–100,000

ST-24

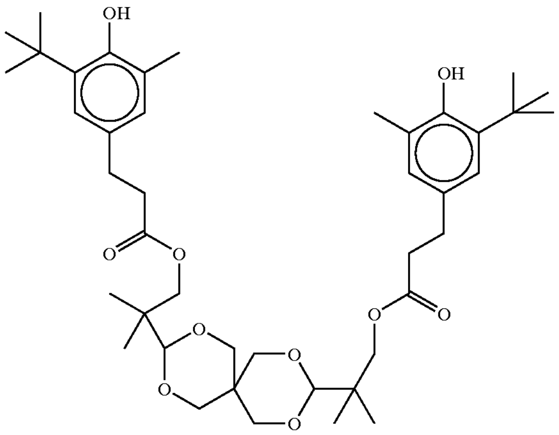

Examples of solvents which may be used in the invention include the following:

| | |
|---|---|
| Tritolyl phosphate | S-1 |
| Dibutyl phthalate | S-2 |
| Diundecyl phthalate | S-3 |
| N,N-Diethyldodecanamide | S-4 |
| N,N-Dibutyldodecanamide | S-5 |
| Tris(2-ethylhexyl)phosphate | S-6 |
| Acetyl tributyl citrate | S-7 |
| 2,4-Di-tert-pentylphenol | S-8 |
| 2-(2-Butoxyethoxy)ethyl acetate | S-9 |
| 1,4-Cyclohexyldimethylene bis(2-ethylhexanoate) | S-10 |

The dispersions used in photographic elements may also include ultraviolet (UV) stabilizers and so-called liquid UV stabilizers such as described in U.S. Pat. Nos. 4,992,358; 4,975,360; and 4,587,346. Examples of UV stabilizers are shown below.

UV-1

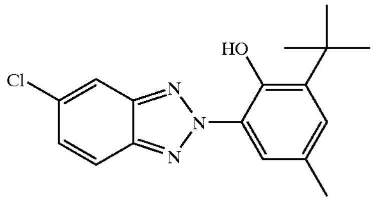

UV-2

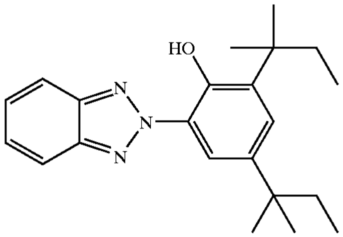

UV-3

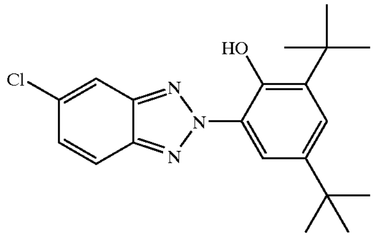

UV-4

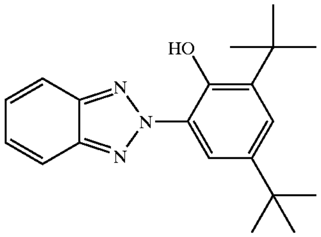

UV-5

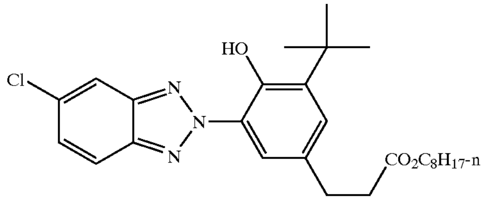

UV-6

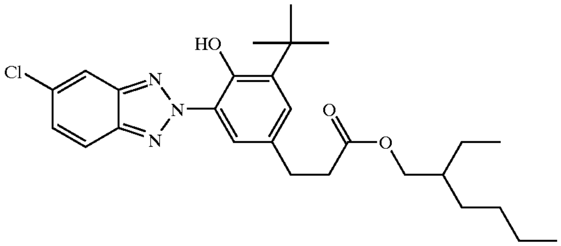

UV-7

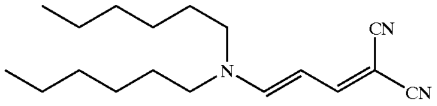

-continued

UV-8

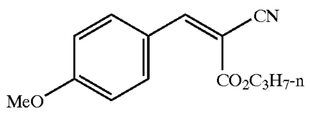

The aqueous phase may include surfactants. Surfactant may be cationic, anionic, zwitterionic, or non-ionic. Useful surfactants include, but are not limited to, the following:

SF-1

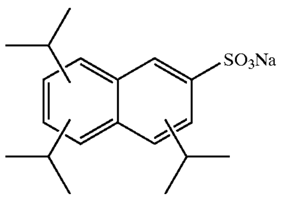

SF-2

$CF_3 \cdot (CF_2)_7 \cdot SO_3Na$

SF-3

$CH_3 \cdot (CH_2)_n \cdot SO_3Na$, n = 12–14

SF-4

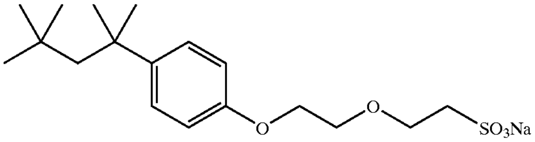

SF-5

$CH_3 \cdot (CH_2)_{11} \cdot OSO_3Na$

SF-6

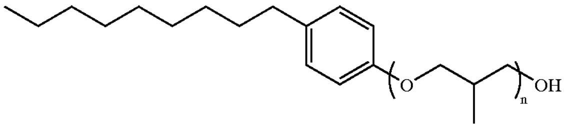

n = ca. 10

SF-7

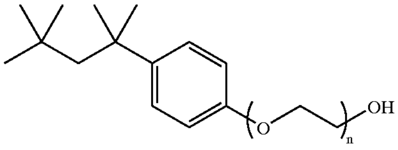

n = ca. 40

SF-8

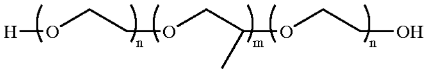

n = ca. 6, m = ca. 2

SF-9

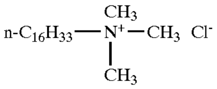

SF-10

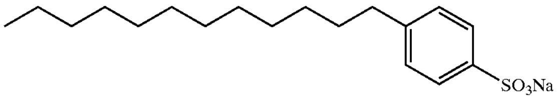

-continued

SF-11

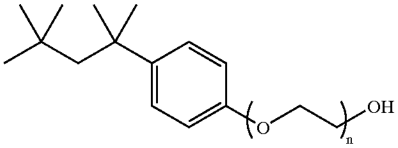

n = ca. 10

SF-12

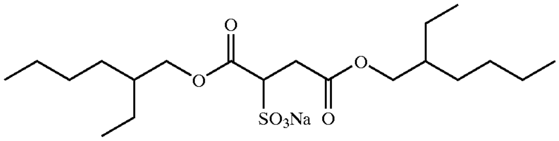

Further, it is contemplated to stabilize photographic dispersions prone to particle growth through the use of hydrophobic, photographically inert compounds such as disclosed by Zengerle et al in U.S. Pat. No. 5,468,604.

In a preferred embodiment the invention employs recording elements which are constructed to contain at least three silver halide emulsion layer units. A suitable full color, multilayer format for a recording element used in the invention is represented by Structure I.

| STRUCTURE I |
| --- |
| Red-sensitized<br>cyan dye image-forming silver halide emulsion unit |
| Interlayer |
| Green-sensitized<br>magenta dye image-forming silver halide emulsion unit |
| Interlayer |
| Blue-sensitized<br>yellow dye image-forming silver halide emulsion unit |
| ///// Support ///// |

wherein the red-sensitized, cyan dye image-forming silver halide emulsion unit is situated nearest the support; next in order is the green-sensitized, magenta dye image-forming unit, followed by the uppermost blue-sensitized, yellow dye image-forming unit. The image-forming units are separated from each other by hydrophilic colloid interlayers containing an oxidized developing agent scavenger to prevent color contamination. Silver halide emulsions satisfying the grain and gelatino-peptizer requirements described above can be present in any one or combination of the emulsion layer units. Additional useful multicolor, multilayer formats for an element of the invention include structures as described in U.S. Pat. No. 5,783,373. Each of such structures in accordance with the invention preferably would contain at least three silver halide emulsions comprised of high chloride grains having at least 50 percent of their surface area bounded by {100} crystal faces and containing dopants from classes (i) and (ii), as described above. Preferably, each of the emulsion layer units contains emulsion satisfying these criteria.

Conventional features that can be incorporated into multilayer (and particularly multicolor) recording elements contemplated for use in the method of the invention are illustrated by *Research Disclosure*, Item 38957, cited above:

XI. Layers and layer arrangements
XII. Features applicable only to color negative
XIII. Features applicable only to color positive
B. Color reversal
C. Color positives derived from color negatives
XIV. Scan facilitating features.

The recording elements comprising the radiation sensitive high chloride emulsion layers according to this invention can be conventionally optically printed, or in accordance with a particular embodiment of the invention can be image-wise exposed in a pixel-by-pixel mode using suitable high energy radiation sources typically employed in electronic printing methods. Suitable actinic forms of energy encompass the ultraviolet, visible and infrared regions of the electromagnetic spectrum as well as electron-beam radiation and is conveniently supplied by beams from one or more light emitting diodes or lasers, including gaseous or solid state lasers. Exposures can be monochromatic, orthochromatic or panchromatic. For example, when the recording element is a multilayer multicolor element, exposure can be provided by laser or light emitting diode beams of appropriate spectral radiation, for example, infrared, red, green or blue wavelengths, to which such element is sensitive. Multicolor elements can be employed which produce cyan, magenta and yellow dyes as a function of exposure in separate portions of the electromagnetic spectrum, including at least two portions of the infrared region, as disclosed in the previously mentioned U.S. Pat. No. 4,619,892. Suitable exposures include those up to 2000 nm, preferably up to 1500 nm. Suitable light emitting diodes and commercially available laser sources are known and commercially available. Imagewise exposures at ambient, elevated or reduced temperatures and/or pressures can be employed within the useful response range of the recording element determined by conventional sensitometric techniques, as illustrated by T. H. James, *The Theory of the Photographic Process*, 4th Ed., Macmillan, 1977, Chapters 4, 6, 17, 18 and 23.

It has been observed that anionic $[MX_xY_yL_z]$ hexacoordination complexes, where M is a group 8 or 9 metal (preferably iron, ruthenium or iridium), X is halide or pseudohalide (preferably Cl, Br or CN) x is 3 to 5, Y is $H_2O$, y is 0 or 1, L is a C—C, H—C or C—N—H organic ligand, and Z is 1 or 2, are surprisingly effective in reducing high intensity reciprocity failure (HIRF), low intensity reciprocity failure (LIRF) and thermal sensitivity variance and in improving latent image keeping (LIK). As herein employed, HIRF is a measure of the variance of photographic properties for equal exposures, but with exposure times ranging from $10^{-1}$ to $10^{-6}$ second. LIRF is a measure of the variance of photographic properties for equal exposures, but with exposure times ranging from $10^{-1}$ to 100 seconds. Although these advantages can be generally compatible with face centered cubic lattice grain structures, the most striking improvements have been observed in high (>50 mole %, preferably ≧90 mole %) chloride emulsions. Preferred C—C, H—C, or C—N—H organic ligands are aromatic heterocycles of the type described in U.S. Pat. No. 5,462,849. The most effective C—C, H—C, or C—N—H organic ligands are azoles and azines, either unsustituted or containing alkyl, alkoxy or halide substituents, where the alkyl moieties contain from 1 to 8 carbon atoms. Particularly preferred azoles and azines include thiazoles, thiazolines and pyrazines.

The quantity or level of high energy actinic radiation provided to the recording medium by the exposure source is generally at least $10^{-4}$ ergs/cm, typically in the range of about $10^{-4}$ ergs/cm$^2$ to $10^{-3}$ ergs/cm$^2$ and often from $10^{-3}$ ergs/cm$^2$ to $10^2$ ergs/cm$^2$. Exposure of the recording element in a pixel-by-pixel mode as known in the prior art persists for only a very short duration or time. Typical maximum exposure times are up to 100$\mu$ seconds, often up to 10$\mu$ seconds, and frequently up to only 0.5$\mu$ seconds. Single or multiple exposures of each pixel are contemplated. The pixel density is subject to wide variation, as is obvious to those skilled in the art. The higher the pixel density, the sharper the images can be, but at the expense of equipment complexity. In general, pixel densities used in conventional electronic printing methods of the type described herein do not exceed $10^7$ pixels/cm$^2$ and are typically in the range of about $10^4$ to $10^6$ pixels/cm$^2$. An assessment of the technology of high-quality, continuous-tone, color electronic printing using silver halide photographic paper which discusses various features and components of the system, including exposure source, exposure time, exposure level and pixel density and other recording element characteristics is provided in Firth et al., *A Continuous-Tone Laser Color Printer*, Journal of Imaging Technology, Vol. 14, No. 3, June 1988. As previously indicated herein, a description of some of the details of conventional electronic printing methods comprising scanning a recording element with high energy beams such as light emitting diodes or laser beams, are set forth in Hioki U.S. Pat. No. 5,126,235, European Patent Applications 479 167 A1 and 502 508 A1.

Once imagewise exposed, the recording elements can be processed in any convenient conventional manner to obtain a viewable image. Such processing is illustrated by *Research Disclosure*, Item 38957, cited above:

XVIII. Chemical development systems
XIX. Development
XX. Desilvering, washing, rinsing and stabilizing In addition, a useful developer for the inventive material is a homogeneous, single part developing agent. The homogeneous, single-part color developing concentrate is prepared using a critical sequence of steps:

In the first step, an aqueous solution of a suitable color developing agent is prepared. This color developing agent is generally in the form of a sulfate salt. Other components of the solution can include an antioxidant for the color developing agent, a suitable number of alkali metal ions (in an at least stoichiometric proportion to the sulfate ions) provided by an alkali metal base, and a photographically inactive water-miscible or water-soluble hydroxy-containing organic solvent. This solvent is present in the final concentrate at a concentration such that the weight ratio of water to the organic solvent is from about 15:85 to about 50:50.

In this environment, especially at high alkalinity, alkali metal ions and sulfate ions form a sulfate salt that is precipitated in the presence of the hydroxy-containing organic solvent. The precipitated sulfate salt can then be readily removed using any suitable liquid/solid phase separation technique (including filtration, centrifugation or decantation). If the antioxidant is a liquid organic compound, two phases may be formed and the precipitate may be removed by discarding the aqueous phase.

The color developing concentrates of this invention include one or more color developing agents that are well known in the art that, in oxidized form, will react with dye forming color couplers in the processed materials. Such color developing agents include, but are not limited to, aminophenols, p-phenylenediamines (especially N,N-dialkyl-p-phenylenediamines) and others which are well known in the art, such as EP 0 434 097 A1 (published Jun. 26, 1991) and EP 0 530 921 A1 (published Mar. 10, 1993). It may be useful for the color developing agents to have one or more water-solubilizing groups as are known in the art. Further details of such materials are provided in *Research Disclosure*, publication 38957, pages 592–639 (September 1996). *Research Disclosure* is a publication of Kenneth Mason Publications Ltd., Dudley House, 12 North Street, Emsworth, Hampshire PO10 7DQ England (also available from Emsworth Design Inc., 121 West 19th Street, New York, N.Y. 10011). This reference will be referred to hereinafter as "Research Disclosure".

Preferred color developing agents include, but are not limited to, N,N-diethyl p-phenylenediamine sulfate (KODAK Color Developing Agent CD-2), 4-amino-3-methyl-N-(2-methane sulfonamidoethyl)aniline sulfate, 4-(N-ethyl-N-β-hydroxyethylamino)-2-methylaniline sulfate (KODAK Color Developing Agent CD-4), p-hydroxyethylethylaminoaniline sulfate, 4-(N-ethyl-N-2-methanesulfonylaminoethyl)-2-mcthylphenylenediamine sesquisulfate (KODAK Color Developing Agent CD-3), 4-(N-ethyl-N-2-methanesulfonylaminoethyl)-2-methylphenylenediamine sesquisulfate, and others readily apparent to one skilled in the art.

In order to protect the color developing agents from oxidation, one or more antioxidants are generally included in the color developing compositions. Either inorganic or organic antioxidants can be used. Many classes of useful antioxidants are known, including but not limited to, sulfites (such as sodium sulfite, potassium sulfite, sodium bisulfite and potassium metabisulfite), hydroxylamine (and derivatives thereof), hydrazines, hydrazides, amino acids, ascorbic acid (and derivatives thereof), hydroxamic acids, aminoketones, mono- and polysaccharides, mono- and polyamines, quaternary ammonium salts, nitroxy radicals, alcohols, and oximes. Also useful as antioxidants are 1,4-cyclohexadiones. Mixtures of compounds from the same or different classes of antioxidants can also be used if desired.

Especially useful antioxidants are hydroxylamine derivatives as described, for example, in U.S. Pat. Nos. 4,892,804; 4,876,174; 5,354,646; and 5,660,974, all noted above, and U.S. Pat. No. 5,646,327 (Burns et al). Many of these antioxidants are mono- and dialkylhydroxylamines having one or more substituents on one or both alkyl groups. Particularly useful alkyl substituents include sulfo, carboxy, amino, sulfonamido, carbonamido, hydroxy, and other solubilizing substituents.

More preferably, the noted hydroxylamine derivatives can be mono- or dialkylhydroxylamines having one or more hydroxy substituents on the one or more alkyl groups. Representative compounds of this type are described, for example, in U.S. Pat. No. 5,709,982 (Marrese et al) as having the structure I:

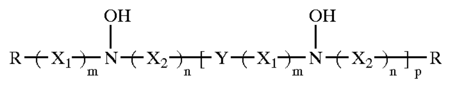

wherein R is hydrogen, a substituted or unsubstituted alkyl group of 1 to 10 carbon atoms, a substituted or unsubstituted hydroxyalkyl group of 1 to 10 carbon atoms, a substituted or unsubstituted cycloalkyl group of 5 to 10 carbon atoms, or a substituted or unsubstituted aryl group having 6 to 10 carbon atoms in the aromatic nucleus.

$X_1$ is —$CR_2(OH)CHR_1$— and $X_2$ is —$CHR_1CR_2(OH)$— wherein $R_1$ and $R_2$ are independently hydrogen, hydroxy, a substituted or unsubstituted alkyl group or 1 or 2 carbon atoms, a substituted or unsubstituted hydroxyalkyl group of 1 or 2 carbon atoms, or $R_1$ and $R_2$ together represent the carbon atoms necessary to complete a substituted or unsubstituted 5- to 8-membered saturated or unsaturated carbocyclic ring structure.

Y is a substituted or unsubstituted alkylene group having at least 4 carbon atoms, and has an even number of carbon atoms, or Y is a substituted or unsubstituted divalent aliphatic group having an even total number of carbon and oxygen atoms in the chain, provided that the aliphatic group has a least 4 atoms in the chain.

Also in Structure I, m, n, and p are independently 0 or 1. Preferably, each of m and n is 1, and p is 0.

Specific di-substituted hydroxylamine antioxidants include, but are not limited to, N,N-bis(2,3-dihydroxypropyl)hydroxylamine, N,N-bis(2-methyl-2,3-dihydroxypropyl)hydroxylamine and N,N-bis(1-hydroxymethyl-2-hydroxy-3-phenylpropyl)hydroxylamine. The first compound is preferred.

The following example illustrates the practice of this invention. It is not intended to be exhaustive of all possible variations of the invention. Parts and percentages are by weight unless otherwise indicated.

EXAMPLES

Example 1

In this example, papers comprising kenaf pulp and standard photographic pulps were made using a hand-sheet mold. Paper bases A and B of the invention comprising 100% kenaf and 15% kenaf/85% hardwood with the hardwood furnish comprising roughly 45% poplar, 30% maple, and 20% birch, respectively, were compared with control paper base C comprising 100% hardwood furnish comprising roughly 45% poplar, 30% maple, and 20% birch. This example will demonstrate that imaging paper bases containing kenaf exhibit some advantages over standard paper bases. This example will also demonstrate that imaging paper bases comprising a mixture of kenaf and standard pulps are superior to the control paper. Kenaf is a highly yellow, low brightness pulp. It is unlikely that a 100% Kenaf pulp can meet current colorimetry targets for imaging paper, particularly photographic paper, without significant modification. Accordingly, an 85% hardwood furnish (comprising roughly 45% poplar, 30% maple, and 20% birch)/15% Kenaf blend was studied because this ratio maximized the use of Kenaf pulp while remaining within the current colorimetry target range.

Paper Base A of the invention was prepared as follows:

Kenaf pulp samples were dispersed in water to a consistency of 2% (40 g pulp in 2000 ml water) using a pulp blender. 3.1 gram handsheets (156 $Kg/Km^2$) were then prepared using a standard hand sheet mold following TAPPI procedure T205. No chemicals were used. After pressing, drying, and calendering following standard procedures, the samples were equilibrated overnight in a humidity chamber (22.8° C., 50% RH).

Paper Base B of the invention was prepared in a similar fashion except the appropriate quantities of samples of a hardwood furnish comprising roughly 45% poplar, 30% maple, and 20% birch pulp were also dispersed, along with kenaf pulp samples in water to the same consistency using a similar procedure.

Paper Base C is a standard photographic paper base prepared in a similar fashion.

Table 1 below presents the composition of each of the hand sheets of the invention and of the control. Each result presented is the tested average of 4 separate hand sheets. Numbers in parentheses are standard deviations.

TABLE 1

| Paper Base | Hardwood furnish | Kenaf | Basis weight ($Kg/Km^2$) | Caliper ($\mu m$) |
|---|---|---|---|---|
| A (control) | 0% | 100% | 143 | 246 |
| B (invention) | 85% | 15% | 155 | 251 |
| C (invention) | 100% | 0% | 145 | 238 |

Hand sheet test results are presented in Table 2. Each result presented is the tested average of 4 separate hand sheets. Numbers in parentheses are standard deviations. Stiffness was measured using a Lorentzen and Wetter type tester according to Tappi Method T 556. The bending resistance in milliNewtons of a 20 mm wide vertically clamped sample is measured for a 15° deflection angle. Measured stiffness was then adjusted to remove weight and caliper differences between the invention and control using the following equation, as weight and caliper differences will result in performance. differences;

$$\text{Adjusted stiffness}=(\text{raw stiffness}\times 100)/(\text{avg. caliper})^{(2+(\textit{basis weight/avg. caliper})/1.54)}$$

Huygen bond was measured using an internal bond tester according to Tappi Method T 883. A paper specimen bonded on both sides by a double-sided adhesive paper tape is adhered to a right-angled metal fixture, which is impacted parallel to the surface of the paper by means of a pendulum at about 90° from its release point. The impact results in the delamination of the paper and the pointer of the tester indicates the energy lost in rupturing the paper structure.

Colorimetry was measured using a Hunter Ultra Scan calorimeter configured at D65/10 with uv out filter located at 460 nm, specular reflectance included, single thickness, backed by black.

Brightness was measured at an effective wavelength of 457 nm using a suitable reflectometer according to Tappi Method T 525. This method utilizes an integrating sphere to provide diffuse illumination and perpendicular observation geometry. The measurements are made in terms of absolute reflectance. Opacity was measured according to ASTM method E308-96, specular reflectance was included, and the testing was done by measuring one sheet backed by black and then backed by white (Baryta).

Smoothness was measured according to Tappi Method T538—'Roughness of paper and paperboard (Sheffield Method)'. This method involves a measurement of the air flow between the specimen (backed by flat glass on the bottom side) and two pressurized, concentric annular lands that are impressed into the sample from the topside. The rate of air flow is related to the surface roughness of paper and paperboard. The lower the smoothness value, the more glossy appearing the resulting image will become when imaging layers are applied to the base.

TABLE 2

| Paper Base | Stiffness (Adj) | Huygen bond | L*uvo | b*uvo | Opacity | Brightness | Smoothness |
|---|---|---|---|---|---|---|---|
| A | 68.2 | 106 | 93.25 | 1.27 | 93.01 | 84.34 | 255 (9) |
| | (20.3) | (4.58) | (0.07) | (0.03) | (0.21) | (0.18) | |
| B | 89.98 | 68.60 | 95.08 | 0.72 | 93.45 | 89.23 | 239 (9) |
| | (5.18) | (4.16) | (0.08) | (0.02) | (0.23) | (0.08) | |
| C | 81.17 | 47.60 | 95.01 | 0.27 | 92.72 | 90.64 | 237 (8) |
| | (3.58) | (5.64) | (0.04) | (0.01) | (0.11) | (0.06) | |

As clearly illustrated by the data in Table 2, higher stiffness, superior strength, and higher opacity papers were obtained at comparable surface smoothness, particularly for invention material B as compared to control material A and invention material C that contained 100% kenaf fiber. Further, invention material B is within acceptable L*uvo and b*uvo ranges of the control material C. Thus, the invention material B, consisting of 85% hardwood fiber and 15% kenaf, is superior for use as an imaging support base to both the control material C and the material that contains 100% hardwood fiber and material A which contains 100% kenaf fiber.

The invention has been described in detail with particular reference to certain preferred embodiments thereof, but it will be understood that variations and modifications can be effected within the spirit and scope of the invention.

What is claimed is:

1. An imaging member comprising an image layer and a paper base comprising a mixture of kenaf fibers and wood fibers wherein said kenaf fibers comprise between 5 and 25 percent by weight of said paper base, wherein said kenaf has a fiber length of between 0.4 and 0.9 mm, said paper base comprises a paper having a surface roughness of between 0.08 and 0.20 $\mu m$, and said paper base comprises a paper that is a combination of hardwood wood fibers and kenaf fibers.

2. The imaging member of claim 1 wherein said kenaf fibers comprise between 10 and 15 percent by weight of said page base.

3. The imaging member of claim 1 wherein said kenaf is present in an amount of between 10 and 20 percent by weight of said paper base.

4. The imaging member of claim 1 wherein said kenaf comprises a paper having a Huygen bond strength of between 2.4 $N/m^2$ and 5.3 $N/m^2$.

5. The imaging member of claim 1 wherein the paper base has a stiffness of between 75 and 225 millinewtons.

6. The imaging member of claim 1 wherein said paper base has a brightness of greater 80 brightness units.

7. The imaging member of claim 1 wherein said base paper comprises a paper that has a weight ratio of wood fibers to kenaf fibers of between of 12:1 to 4:1.

8. The imaging member of claim 1 wherein said base paper comprises a paper that is a combination of wood fibers and kenaf fibers wherein said wood fibers comprise hardwood fibers and softwood fibers.

9. The imaging member of claim 1 wherein said base paper comprises a paper that is a combination of synthetic fibers and kenaf fibers.

10. The imaging member of claim 1 wherein said base paper comprises a paper that comprises wet strength resin.

11. The imaging member of claim 2 wherein said base paper comprises a paper that comprises hydrophobic sizing chemistry.

12. The imaging member of claim 2 wherein said base paper comprises a paper that has at least one waterproofing layer.

13. The imaging member of claim 12 wherein said waterproofing layer comprises a melt extruded polymer layer.

14. The imaging member of claim 12 wherein said waterproofing layer comprises an oriented polymer sheet.

15. The imaging member of claim 12 further comprising a pressure sensitive adhesive layer.

16. The imaging member of claim 1 wherein said image layer comprises at least one photosensitive silver halide containing layer.

17. The imaging member of claim 1 wherein said image layer comprises at least one ink jet receiving layer.

18. The imaging member of claim 1 wherein said image layer comprises at least one thermal dye-transfer image receiving layer.

19. The imaging member of claim 1 wherein said image layer comprises at least one electrophotographic image receiving layer.

20. The imaging member of claim 1 wherein said paper has a Sheffield smoothness of between 237 and 255.

* * * * *